(12) United States Patent
Matsumoto et al.

(10) Patent No.: US 10,921,583 B2
(45) Date of Patent: Feb. 16, 2021

(54) OCULAR OPTICAL SYSTEM INCLUDING A LENS GROUP HAVING CEMENTED LENS AND HEAD-MOUNTED DISPLAY USING THE SAME

(71) Applicant: NIKON CORPORATION, Tokyo (JP)

(72) Inventors: Miho Matsumoto, Tokyo (JP); Atsushi Sekine, Kasukabe (JP); Hidetsugu Takagi, Yokohama (JP)

(73) Assignee: NIKON CORPORATION, Tokyo (JP)

( * ) Notice: Subject to any disclaimer, the term of this patent is extended or adjusted under 35 U.S.C. 154(b) by 128 days.

(21) Appl. No.: 16/181,866

(22) Filed: Nov. 6, 2018

(65) Prior Publication Data

US 2019/0072763 A1    Mar. 7, 2019

Related U.S. Application Data

(63) Continuation of application No. PCT/JP2017/017457, filed on May 9, 2017.

(30) Foreign Application Priority Data

Jul. 7, 2016  (JP) .............................. JP2016-135409

(51) Int. Cl.
*G02B 5/18* (2006.01)
*G02B 27/00* (2006.01)
(Continued)

(52) U.S. Cl.
CPC ........... *G02B 27/0037* (2013.01); *G02B 3/08* (2013.01); *G02B 27/0081* (2013.01);
(Continued)

(58) Field of Classification Search
CPC .. G02B 27/0037; G02B 3/08; G02B 27/0081; G02B 27/0172; G02B 27/4211;
(Continued)

(56) References Cited

U.S. PATENT DOCUMENTS 6,934,084 B2 *  8/2005  Pandya ..................... G02C 7/14
                                                  351/159.58
7,961,396 B2 *  6/2011  Suzuki ............... G02B 27/4277
                                                  359/570

(Continued)

FOREIGN PATENT DOCUMENTS

JP      08254604 A    * 10/1996
JP      2001-141993 A    5/2001
(Continued)

OTHER PUBLICATIONS

International Search Report dated Aug. 8, 2017 in corresponding International Patent Application No. PCT/JP2017/017457.
(Continued)

*Primary Examiner* — Arnel C Lavarias

(57) ABSTRACT

An ocular optical system (EL) comprises, in order from an eye point (EP), a first lens group (G1) having a positive refractive power and a second lens group (G2) having a positive refractive power. The second lens group (G2) includes a cemented lens having two optical members cemented together. A cemented surface of the cemented lens is a diffraction optical surface configuring a diffraction grating. A lens surface on one side in a lens constituting the first lens group (G1) is a first Fresnel surface (FSa), and a lens surface on one side in the cemented lens of the second lens group (G2) is a second Fresnel surface (FSb).

15 Claims, 23 Drawing Sheets

(51) Int. Cl.
*G02B 3/08* (2006.01)
*G02B 27/01* (2006.01)
*G02B 27/42* (2006.01)
*G02B 25/00* (2006.01)
*G02B 30/36* (2020.01)

(52) U.S. Cl.
CPC ...... *G02B 27/0172* (2013.01); *G02B 27/4211* (2013.01); *G02B 27/4216* (2013.01); *G02B 5/1814* (2013.01); *G02B 25/00* (2013.01); *G02B 30/36* (2020.01); *G02B 2027/011* (2013.01); *G02B 2027/0116* (2013.01)

(58) Field of Classification Search
CPC .. G02B 27/4216; G02B 30/36; G02B 5/1814; G02B 25/00; G02B 2027/011; G02B 2027/0116; G02B 5/1876; G02B 5/18; G02B 2005/1804; G02B 5/1842; G02B 5/189; G02B 5/1895; G02B 27/42
USPC ....... 359/567, 566, 569, 565, 570, 574, 575, 359/576, 457, 741, 742
See application file for complete search history.

(56) References Cited

U.S. PATENT DOCUMENTS

| | | |
|---|---|---|
| 2004/0136041 A1 | 7/2004 | Togino |
| 2010/0246006 A1 | 9/2010 | Suzuki |
| 2016/0178912 A1 | 6/2016 | Kusuda et al. |
| 2019/0227305 A1* | 7/2019 | Fortin-Desch nes ...... G02B 25/008 |

FOREIGN PATENT DOCUMENTS

| | | |
|---|---|---|
| JP | 2004-61906 | 2/2004 |
| JP | 2012-108296 | 6/2012 |
| JP | 2015-49305 | 3/2015 |
| TW | 200931069 | 7/2009 |
| WO | WO2009/078357 A1 | 6/2009 |

OTHER PUBLICATIONS

English Translation by WIPO of the International Preliminary Report on Patentability dated Jan. 17, 2019 in International Patent Application No. PCT/JP2017/017457, 8 pages.
Chinese Office Action dated Feb. 3, 2020 in Chinese Patent Application No. 201780005066.1.
Office Action dated May 11, 2020 from the Taiwanese Patent Office in corresponding Taiwanese Patent Application No. 106115303.
Chinese Office Action dated Aug. 28, 2020 in corresponding Chinese Patent Application No. 201780005066.1.
Notice of Reasons for Refusal dated Nov. 30, 2020, in corresponding Japanese Patent Application No. 2018-525957.

* cited by examiner

SPHERICAL ABERRATION

ASTIGMATISM

DISTORTION

LATERAL CHROMATIC ABERRATION

SPHERICAL ABERRATION

ASTIGMATISM

DISTORTION

LATERAL CHROMATIC ABERRATION

OCULAR OPTICAL SYSTEM INCLUDING A LENS GROUP HAVING CEMENTED LENS AND HEAD-MOUNTED DISPLAY USING THE SAME

CROSS-REFERENCE TO RELATED APPLICATIONS

This is a continuation of PCT International Application No. PCT/JP2017/017457, filed on May 9, 2017, which is hereby incorporated by reference. This application also claims the benefit of Japanese Patent Application No. 2016-135409, filed in Japan on Jul. 7, 2016, which is hereby incorporated by reference.

TECHNICAL FIELD

The present invention relates to an ocular (or eyepiece) optical system and a head-mounted display.

TECHNICAL BACKGROUND

Patent Document 1, for example, discloses a head-mounted display comprising an ocular optical system. Such an ocular optical system is preferably of a low-profile type from a viewpoint of reducing weight.

PRIOR ARTS LIST

Patent Document

PATENT DOCUMENT 1: Japanese Laid-Open Patent Publication No. 2015-49305(A)

SUMMARY OF THE INVENTION

An ocular optical system according to a first aspect comprises, in order from an eye point, a first lens group having a positive refractive power and a second lens group having a positive refractive power. One of the first lens group and the second lens group includes a cemented lens having at least two optical members cemented together. A cemented surface of the cemented lens is a diffraction optical surface configuring a diffraction grating. At least any one of lens surfaces of lenses constituting the first lens group and the second lens group is formed in a Fresnel surface.

A head-mounted display according to a second aspect comprises an image display unit capable of displaying an image and an ocular optical system for observing the image displayed on the image display unit, in which the ocular optical system is formed in the ocular optical system described above.

DESCRIPTION OF THE EMBODIMENTS

Figure 1:
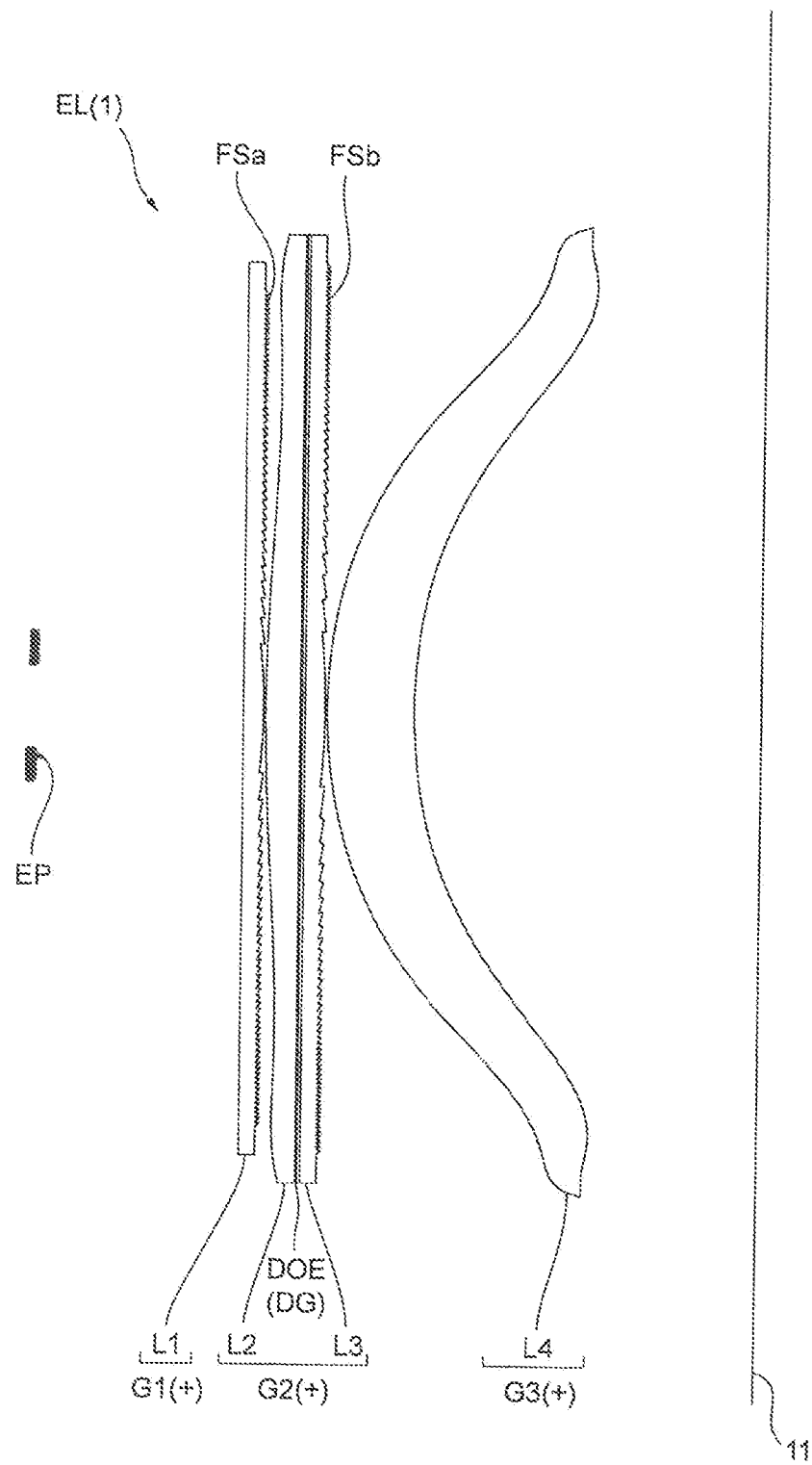
FIG. 1 shows a lens configuration of an ocular optical system according to Example 1.

Hereinafter, an ocular optical system and a head-mounted display according to the present embodiment will be described with reference to drawings. As shown in FIG. 1, an ocular optical system EL(1) as one example of the ocular optical system EL according to the present embodiment comprises, in order from an eye point EP, a first lens group G1 having a positive refractive power and a second lens group G2 having a positive refractive power. One (namely, the second lens group G2 in the example shown in FIG. 1) of the first lens group G1 and the second lens group G2 includes a cemented lens having two optical members (a second lens L2 and a third lens L3 in the example shown in FIG. 1) cemented together. A cemented surface of the cemented lens is a diffraction optical surface configuring a diffraction grating DG. At least any one of lens surfaces of lenses constituting the first lens group G1 and the second lens group G2 is formed in a Fresnel surface. Accordingly, even with a low-profile type, the ocular optical system which has a wide viewing angle, in which various aberrations such as a chromatic aberration are successfully corrected, can be obtained. It should be noted that the Fresnel surface herein is a surface on which a light advancing direction is changed by refracting light, and the diffraction optical surface is a surface on which the light advancing direction is changed by diffracting light.

The ocular optical system EL according to the present embodiment can be used for observing an image displayed on an image display unit 11, for example. The ocular optical system EL according to the present embodiment may be an ocular optical system EL(2) shown in FIG. 6, an ocular optical system EL(3) shown in FIG. 11, or an ocular optical system EL(4) shown in FIG. 16.

The ocular optical system EL according to the present embodiment, wherein the lens surface on one side in the cemented lens is preferably the Fresnel surface. Accordingly, the ocular optical system can be formed into the low-profile type. It should be noted that the Fresnel surface or the lens surface of an aspherical surface herein means the surface in a concept without including the cemented surface of the cemented lens.

The ocular optical system EL according to the present embodiment, wherein a lens surface different from the Fresnel surface of the cemented lens is preferably an aspherical surface. Accordingly, various aberrations such as astigmatism can be successfully corrected.

The ocular optical system EL according to the present embodiment, wherein a lens group (namely, the first lens group G1 in the example in FIG. 1) without including the cemented lens in the lens group of the first lens group G1 and the second lens group G2 comprises at least one lens, and the lens surface on one side in the one lens may be the Fresnel surface. Accordingly, the ocular optical system can be formed into the low-profile type.

The optical system EL according to the present embodiment, wherein one of the first lens group G1 and the second lens group G2 preferably consists of the cemented lens having the positive refractive power, and the other of the first lens group G1 and the second lens group G2 preferably consists of one lens having the positive refractive power. Accordingly, even with a low-profile type ocular optical system, the viewing angle is extended and various aberrations such as the astigmatism can be successfully corrected. In addition, an aspect ratio of a Fresnel step on the Fresnel surface can be designed to be small to form the ocular optical system which can be easily manufactured.

The ocular optical system EL according to the present embodiment, wherein the second lens group G2 may consist of the cemented lens having the positive refractive power, and the first lens group G1 may consist of one lens having the positive refractive power. Accordingly, even with the low-profile type ocular optical system, the viewing angle is extended and various aberrations such as the astigmatism can be successfully corrected. In addition, the aspect ratio of the Fresnel step on the Fresnel surface can be designed to be small to form the ocular optical system which can be easily manufactured.

The ocular optical system EL according to the present embodiment may comprise, in order from an eye point EP, the first lens group G1, the second lens group G2, and a third lens group G3 having an aspherical lens. Accordingly, various aberrations such as the astigmatism can be successfully corrected. In addition, the aspect ratio of the Fresnel step on the Fresnel surface can be designed to be small to form the ocular optical system which can be easily manufactured.

The ocular optical system EL according to the present embodiment, wherein a focal length of the first lens group G1 may be shorter than a focal length of the second lens group G2. Accordingly, various aberrations such as a spherical aberration can be successfully corrected by providing a strong refractive power (power) for the first lens group G1 near a pupil position (position of an exit pupil) of the ocular optical system EL.

The ocular optical system EL according to the present embodiment, wherein the first lens group G1 and the second lens group G2 each comprises the lens on which the Fresnel surface is formed, thereby preferably satisfying the following conditional expression (1):

$$1.00 < fR2/fR1 \quad (1)$$

where, fR1 denotes a focal length of the lens on which the Fresnel surface is formed in the first lens group G1; and fR2 denotes a focal length of the lens on which the Fresnel surface is formed in the second lens group G2.

The conditional expression (1) is a conditional expression specifying an appropriate range of a ratio of the focal length of the lens on which the Fresnel surface is formed in the first lens group G1 to the focal length of the lens on which the Fresnel surface is formed in the second lens group G2. The focal length of the lens on which the Fresnel surface is formed in the first lens group G1 becomes shorter than the focal length of the lens on which the Fresnel surface is formed in the second lens group G2 by satisfying the conditional expression (1). More specifically, the refractive power (power) of the lens on which the Fresnel surface is formed in the first lens group G1 becomes greater than the focal length of the lens on which the Fresnel surface is formed in the second lens group G2. Thus, various aberrations such as the spherical aberration can be successfully corrected by providing a strong power for the lens on which the Fresnel surface is formed in the first lens group G1 near the pupil position (position of the exit pupil).

If a corresponding value in the conditional expression (1) is less than a lower limit, the focal length of the lens on which the Fresnel surface is formed in the first lens group G1 becomes longer than the focal length of the lens on which the Fresnel surface is formed in the second lens group G2. Therefore, it becomes difficult to provide the strong power for the lens on which the Fresnel surface is formed in the first lens group G1, and it becomes difficult to correct various aberrations such as the spherical aberration.

It should be noted that an upper limit in the conditional expression (1) may be adjusted to a level, preferably, less than 1.80, and more preferably, less than 1.70. Accordingly, such occurrence can be prevented in which the aspect ratio of the Fresnel step on the Fresnel surface becomes excessively large because the power of the lens on which the Fresnel surface is formed in the first lens group G1 is excessively strong to cause difficulty in manufacturing the ocular optical system EL comprising the lens on which the Fresnel surface is formed.

The ocular optical system EL according to the present embodiment, wherein the cemented lens is preferably cemented together through a contact multilayer type diffraction optical element DOE consisted of a first optical element component DE1 and a second optical element component DE2, and the diffraction optical surface configuring the diffraction grating DG is preferably formed in an interface between the first optical element component DE1 and the second optical element component DE2. Accordingly, high diffraction efficiency is kept in a desired wavelength region (visible light region, for example), and wavelength characteristics become successful.

Figure 21:
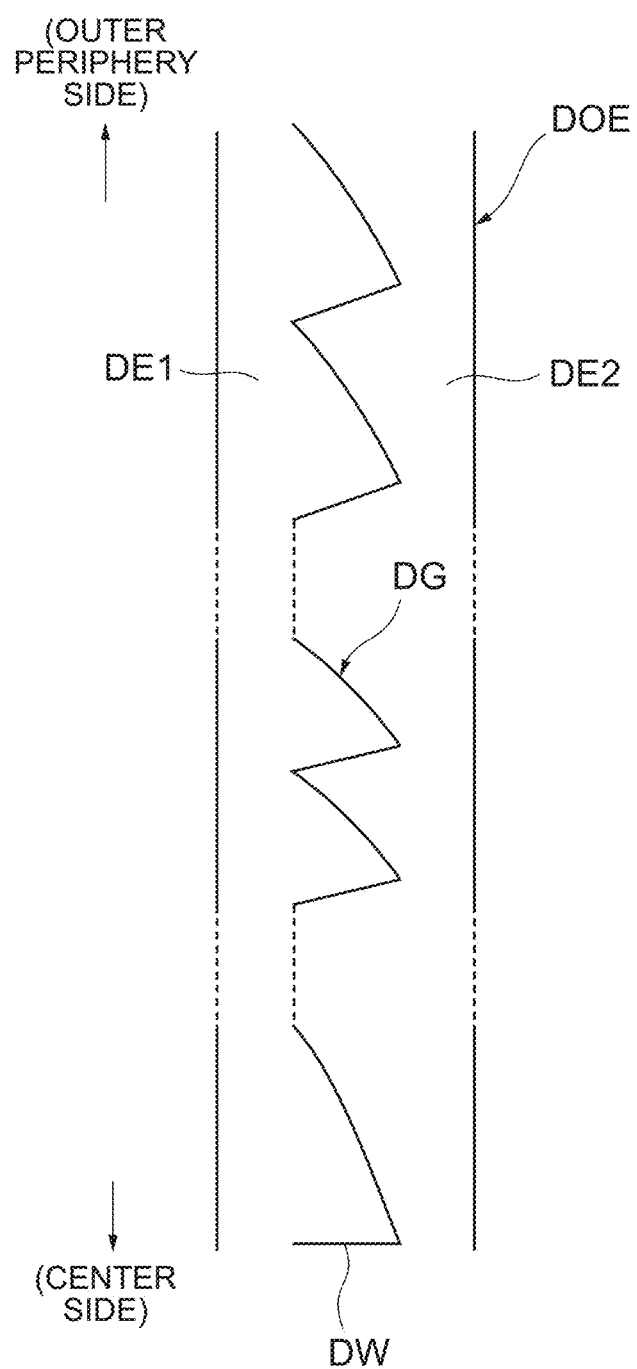
FIG. 21 is a schematic diagram showing one example of a diffraction optical element.

As shown in FIG. 21, for example, the diffraction optical element DOE according to the present embodiment consists of the first optical element component DE1 consisted of a first optical material and the second optical element component DE2 consisted of a second optical material which is different in a refractive index and a dispersion value from the first optical material. In the interface between the first optical element component DE1 and the second optical element component DE2, the diffraction optical surface configuring the diffraction grating DG having a saw-tooth shape in a cross-sectional view is formed in an annular ring form. A grating pitch of the diffraction grating DG in the diffraction optical element DOE according to the present embodiment is different for every position in a radial direction of the diffraction optical element DOE. A wall surface portion DW of the diffraction grating DG is formed so as to extend along an optical axis on a center side of the diffraction optical element DOE, but to be further significantly inclined relative to the optical axis accordingly toward an outer periphery side of the diffraction optical element DOE. Thus, the wall surface portion DW is inclined in such a manner that, when a maximum angle of outgoing light is greater than a minimum angle of incoming light in each annular ring on the diffraction optical surface, the angle becomes an inclination angle in the vicinity of an average value of the maximum angle of outgoing light and the minimum angle of incoming light, and when the maximum angle of outgoing light is smaller than the minimum angle of incoming light, the angle becomes an inclination angle in the vicinity of the minimum angle of incoming light. Thus, refraction or reflection of ray of light in the wall surface portion DW can be reduced.

Figure 22A:
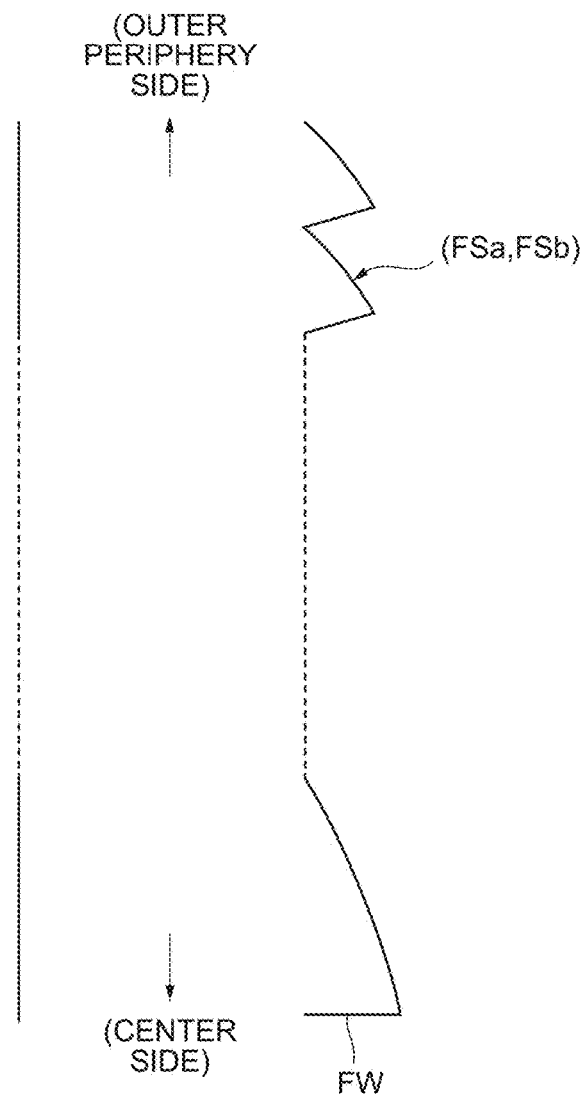
FIG. 22A is a schematic diagram showing one example of a Fresnel surface.
Figure 22B:
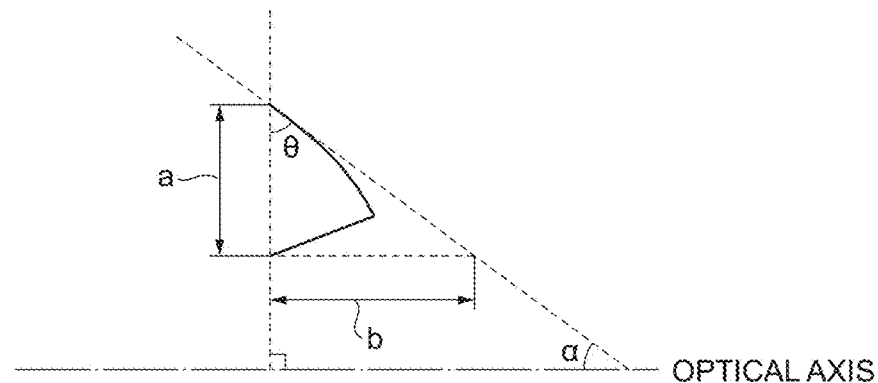
FIG. 22B is a schematic diagram for explaining an aspect ratio on the Fresnel surface.

As shown in FIG. 22A, for example, a Fresnel surface (FSa or FSb) according to the present embodiment is formed in an annular ring form having a saw-tooth shape in a cross-sectional view. A pitch of the Fresnel step on each Fresnel surface is different for every position in the radial direction of the Fresnel lens on which the Fresnel surface is formed. A wall surface portion FW on the Fresnel surface is formed so as to extend along the optical axis on the center side of the Fresnel lens, but to be further significantly inclined relative to the optical axis on the outer periphery side of the Fresnel lens accordingly as the pitch of the Fresnel step on the Fresnel surface is smaller. Thus, the wall surface portion FW is inclined in such a manner that, when the maximum angle of outgoing ray of light is greater than the minimum angle of incoming ray of light in each annular ring on the Fresnel surface, the angle becomes an inclination angle in the vicinity of an average value of the maximum angle of outgoing ray of light and the minimum angle of incoming ray of light, and when the maximum angle of outgoing ray of light is smaller than the minimum angle of incoming ray of light, the angle becomes an inclination angle in the vicinity of the minimum angle of incoming ray of light. Thus, refraction or reflection of ray of light in the wall surface portion FW can be reduced. Here, as shown in FIG. 22B, an angle formed by a tangent on the Fresnel surface and the optical axis is taken as "$\alpha$," and an angle represented by an expression: $\theta=90°-\alpha$ is taken as a tangent angle $\theta$. A ratio represented by an expression: $|b/a|=|\tan\theta|$ based on the tangent angle $\theta$ herein is defined as an aspect ratio of the Fresnel step on each Fresnel surface. It should be noted that the Fresnel surface may be formed in a spherical shape, an aspherical shape, or a straight-line shape in the cross-sectional view.

The ocular optical system EL according to the present embodiment, preferably satisfying the following conditional expression (2):

$$0<f/f\text{DOE}<0.15 \qquad (2)$$

where, f denotes a focal length of the ocular optical system EL; and fDOE denotes a focal length of the diffraction optical element DOE.

The conditional expression (2) is a conditional expression specifying an appropriate range of a ratio of the focal length of the ocular optical system EL to the focal length of the diffraction optical element DOE. If a corresponding value in the conditional expression (2) is more than an upper limit, a power of the diffraction optical element DOE is excessively strong relative to the ocular optical system EL, and therefore a pitch of the diffraction grating DG formed in the diffraction optical element DOE becomes excessively small to cause difficulty in manufacturing the ocular optical system EL comprising the diffraction optical element DOE. In order to ensure an effect of the present embodiment, the upper limit of the conditional expression (2) may be preferably adjusted to 0.10.

The ocular optical system EL according to the present embodiment, wherein the first lens group G1 comprises the lens on which the Fresnel surface is formed, thereby preferably satisfying the following conditional expression (3):

$$0<f/f\text{R1}<0.60 \qquad (3)$$

where, f denotes a focal length of the ocular optical system EL; and fR1 denotes a focal length of the lens on which the Fresnel surface is formed in the first lens group G1.

The conditional expression (3) is a conditional expression specifying an appropriate range of a ratio of the focal length of the ocular optical system EL to the focal length of the lens on which the Fresnel surface is formed in the first lens group G1. If a corresponding value in the conditional expression (3) is more than an upper limit, a power of the lens on which the Fresnel surface is formed in the first lens group G1 relative to the ocular optical system EL is excessively strong, and therefore an aspect ratio of the Fresnel step on the Fresnel surface becomes excessively large to cause difficulty in manufacturing the ocular optical system EL comprising the lens on which the Fresnel surface is formed. In order to ensure the effect of the present embodiment, the upper limit of the conditional expression (3) may be preferably adjusted to 0.50.

The ocular optical system EL according to the present embodiment, wherein the first lens group G1 comprises a lens on which the Fresnel surface is formed, thereby preferably satisfying the following conditional expression (4):

$$0<AS1<5.0 \qquad (4)$$

where, AS1 denotes a maximum value of the aspect ratio of the Fresnel step on the Fresnel surface in the first lens group G1.

The conditional expression (4) is a conditional expression specifying an appropriate range of the maximum value of the aspect ratio of the Fresnel step on the Fresnel surface in the first lens group G1. If a corresponding value in the conditional expression (4) is more than an upper limit, the maximum value of the aspect ratio of the Fresnel step on the Fresnel surface in the first lens group G1 becomes excessively large to cause difficulty in manufacturing the ocular optical system EL comprising the lens on which the Fresnel surface is formed. In order to ensure the effect of the present embodiment, the upper limit in the conditional expression (4) may be preferably adjusted to 1.5.

The ocular optical system EL according to the present embodiment, wherein the first lens group G1 and the second lens group G2 each comprise a lens on which the Fresnel surface is formed, thereby preferably satisfying the following conditional expression (5):

$$0<AS2<2.5 \qquad (5)$$

where, AS2 denotes a maximum value of the aspect ratio of the Fresnel step on the Fresnel surface in the second lens group G2.

The conditional expression (5) is a conditional expression specifying an appropriate range of the maximum value of the aspect ratio of the Fresnel step on the Fresnel surface in the second lens group G2. If a corresponding value in the conditional expression (5) is more than an upper limit, the maximum value of the aspect ratio of the Fresnel step on the Fresnel surface in the second lens group G2 becomes excessively large to cause difficulty in manufacturing the ocular optical system EL comprising the lens on which the Fresnel surface is formed. In order to ensure the effect of the present embodiment, the upper limit of the conditional expression (5) may be preferably adjusted to 1.5.

Figure 23:
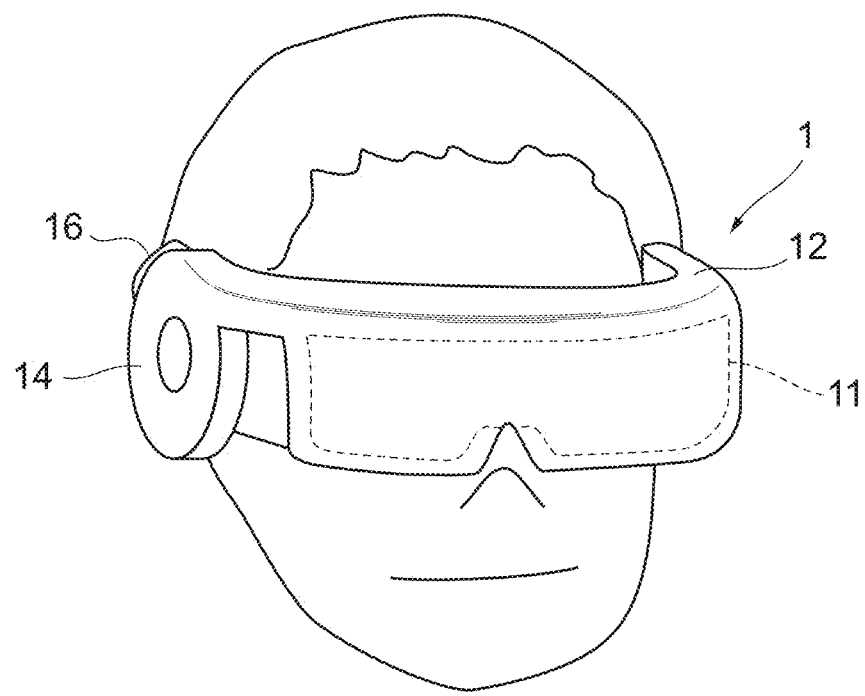
FIG. 23 shows an outline of a head-mounted display.

A head-mounted display according to the present embodiment comprises by including the ocular optical system having the configuration described above. As the specific example, the head-mounted display having the ocular optical system EL will be described based on FIG. 23. A head-mounted display 1 shown in FIG. 23 is used in a state in which the head-mounted display is fixed to a head of a user. The head-mounted display 1 is configured by including an image display unit 11, an ocular optical system EL (not shown in FIG. 23), a housing 12 for housing the components. In addition, speakers 14 for providing the user with sound information are arranged on right and left sides of the housing 12. A band 16 for fixing the housing 12 to the head of the user is attached to a rear portion of the housing 12.

The image display unit 11 and the ocular optical system EL comprise in a manner of being arranged in facing eyes of the user in a state in which the housing 12 is fixed to the head of the user. Although a detailed illustration is omitted, the image display unit 11 is configured by using a liquid crystal display device and the like, for example. In addition, two sets of the ocular optical systems EL are provided in corresponding to both eyes of the user. In such a head-mounted display 1, when the image display unit 11 displays a predetermined image, light from the image display unit 11 is transmitted through the ocular optical system EL to arrive at the eyes of the user. Accordingly, the user can view the image displayed on the image display unit 11 through the ocular optical system EL. It should be noted that the image displayed on the image display unit 11 may be a still image or a moving image. In addition, the image display unit 11 may be configured in such a manner that a parallax image for a right eye and a parallax image for a left eye are displayed, respectively, and the image is recognized as a three-dimensional image by viewing the parallax images through the ocular optical system EL by the user. According to the configuration described above, even with the low-profile type, the head-mounted display which has the wide viewing angle, in which various aberrations such as the chromatic aberration are successfully corrected, can be obtained by mounting the ocular optical system EL.

EXAMPLES

Hereinafter, each Example according to the present application will be described with reference to accompanying drawings. FIGS. 1, 6, 11, and 16 show lens configurations and refractive power distributions of ocular optical systems EL {EL(1) to EL(4)} according to Examples 1 to 4. A sign of '+' or '−' attached to a symbol of each lens group represents a refractive power of each lens group.

In FIGS. 1, 6, 11, and 16, each lens group is represented by a combination of a symbol G and a numeral (or an alphabet), and each lens is represented by a combination of a symbol L and a numeral (or an alphabet), respectively. In this case, in order to prevent complication due to an increase in kinds and the number of symbols and numerals, the lens group or the like is represented by using the combination of the symbol and the numeral for each Example, independently. Therefore, even if the combination of the same symbol and the same numeral is used among Examples, the combination does not mean the same configuration.

Tables 1 to 4 are shown below. Among these tables, Table 1, Table 2, Table 3, and Table 4 are the tables showing values of specifications in Example 1, Example 2, Example 3, and Example 4, respectively. In each Example, a d-line (wavelength $\lambda=587.6$ nm), an e-line (wavelength $\lambda=546.1$ nm), a g-line (wavelength $\lambda=435.8$ nm), a C-line (wavelength $\lambda=656.3$ nm), and an F-line (wavelength $\lambda=486.1$ nm) are selected as calculation objects of aberration characteristics.

In "Specification Data" in each table, f denotes a focal length of an ocular optical system, fDOE denotes a focal length of a diffraction optical element, fR1 denotes a focal length of a lens on which a first Fresnel surface is formed, and fR2 denotes a focal length of a lens on which a second Fresnel surface is formed, respectively. Further, in "Specification Data," ω denotes a viewing angle (unit: °), ER denotes an eye relief, and TL denotes a distance from a lens surface in a place closest to an eye point to an image display unit, respectively. In "Lens Data," a surface number represents the number of each lens surface counted from the eye point, R denotes a radius of curvature of each lens surface, D denotes a distance between respective lens surfaces, vd denotes the Abbe number for the d-line (wavelength $\lambda=587.6$ nm), and nd denotes a refractive index for the d-line (wavelength $\lambda=587.6$ nm), respectively. It should be noted that a symbol "*a" placed on a right in a first column (surface number) indicates that the lens surface is an aspherical surface. A symbol "*b" placed on a right in the first column (surface number) indicates that the lens surface is a Fresnel surface having an aspherical shape. A symbol "*c" placed on the right in the first column (surface number) indicates that the lens surface is a diffraction optical surface configuring a diffraction grating. A symbol "∞" in the radius of curvature indicates a flat surface or an aperture, and the description of a refractive index of air: nd=1.000000 is omitted.

An aspherical coefficient shown in "Aspherical Data" is represented by the following expression (A), when a height in a direction perpendicular to an optical axis (annular ring position) is taken as y, a sag amount in an optical axis direction is taken as X(y), a radius of curvature of a reference spherical surface (paraxial radius of curvature) is taken as r, the conical coefficient is taken as κ, and an n-th (n=2, 4, 6, 8, 10) aspherical coefficient is taken as An. It should be noted that a 2nd order aspherical coefficient A2 is 0, and the description thereof is omitted. "E-n" represents "$\times 10^{-n}$." For example, "1.234E-05" represents "$1.234 \times 10^{-5}$."

$$X(y)=(y^2/r)/\{1+(1-(1+\kappa)\times y^2/r^2)^{1/2}\}+A4\times y^4+A6\times y^6+A8\times y^8+A10\times y^{10} \quad (A)$$

In "Diffraction Optical Surface Data," a phase coefficient on the diffraction optical surface calculated by using a phase function method is shown. A reference wavelength of the phase coefficient is adjusted to 587.6 nm. A phase polynomial expression for determining a shape of the diffraction optical surface is represented by the following expression (B):

$$Z=\Sigma C_j x^m y^n \quad \text{[Expression 1]}$$

where, in Expression (B), a relationship represented by the following expression (C) holds among j, m, and n.

[Expression 2]

$$j = \frac{(m+n)^2 + m + 3n}{2} \quad (C)$$

In "Fresnel Surface Data," ASa denotes an aspect ratio in a position through which a main ray of light having a maximum viewing angle on each Fresnel surface passes, ASb denotes an aspect ratio in a first intermediate position (70% arrival position from a center to the position through which the main ray of light having the maximum viewing angle passes) on a center side from the position through which the main ray of light having the maximum viewing angle on each Fresnel surface passes, and ASc denotes an aspect ratio in a second intermediate position (50% arrival position from the center to the position through which the main ray of light having the maximum viewing angle passes) on the center side from the first intermediate position on each Fresnel surface, respectively. In "Conditional Expression Corresponding Value," a corresponding value in each conditional expression is shown, respectively.

It should be noted that "mm" is generally used as a unit for a focal length f, a radius of curvature R, or any other length listed in all specification values below. However, even if an image is proportionally scaled in the optical system, optical performance equivalent to each other is obtained, and therefore the unit is not limited thereto. The description on the table so far is common to all Examples, and the duplicate description will be omitted.

Example 1

Figure 2:
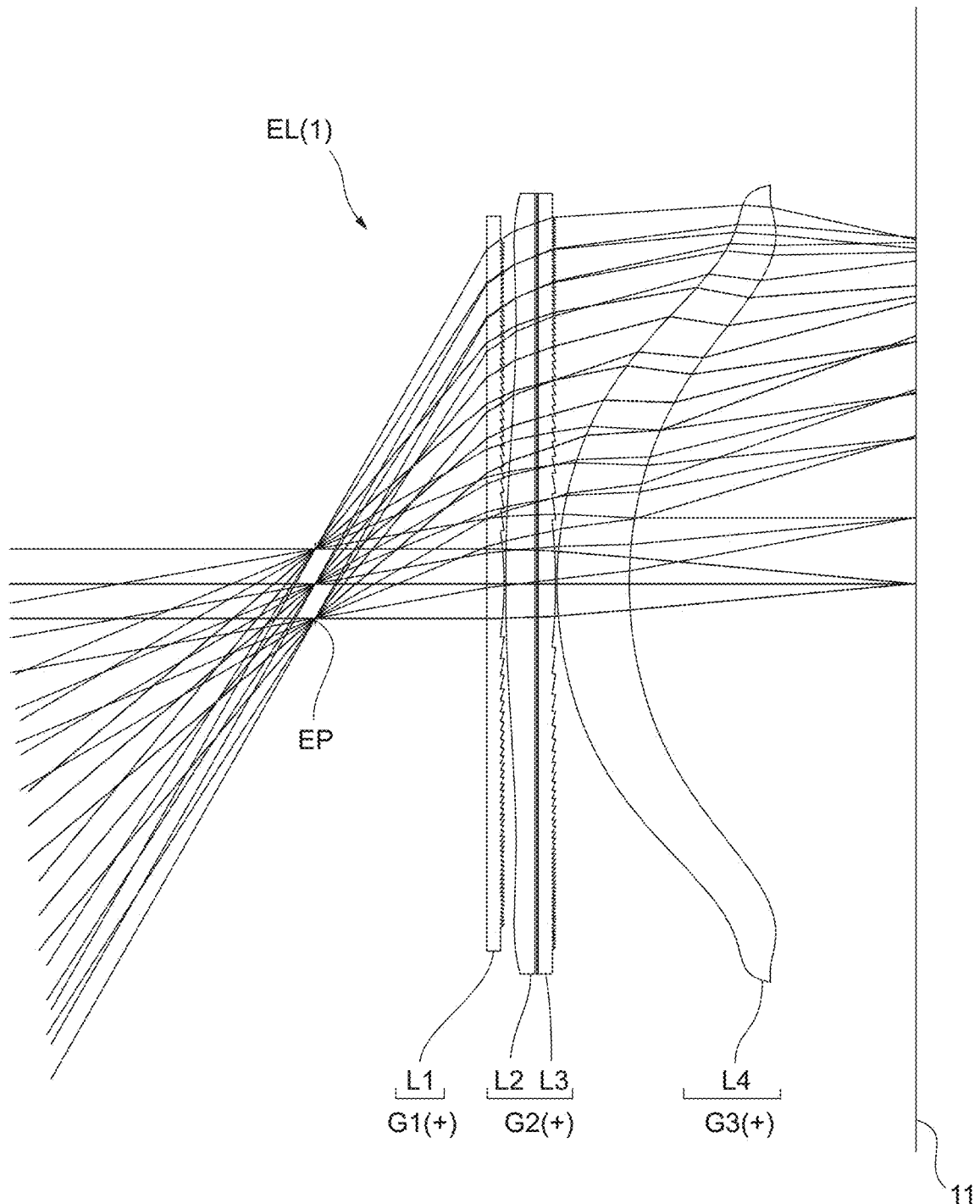
FIG. 2 shows optical paths of the ocular optical system according to Example 1.

First, Example 1 of the present application will be described with reference to FIGS. 1 to 5 and Table 1. An ocular optical system in each Example is used as the ocular optical system for observing an image displayed on an image display unit 11. FIG. 1 shows a lens configuration of an ocular optical system EL(1) according to Example 1. FIG. 2 shows optical paths of the ocular optical system EL(1) according to Example 1. The ocular optical system EL(1) according to Example 1 comprises, in order from an eye point EP, a first lens group G1 having a positive refractive power, a second lens group G2 having a positive refractive power, and a third lens group G3 having a positive refractive power.

The first lens group G1 comprises a first lens L1 having a plano-convex shape and a positive refractive power. The first lens L1 is a Fresnel lens in which a first Fresnel surface FSa having an aspherical shape is formed on a lens surface on the image display unit 11.

The second lens group G2 comprises a cemented positive lens formed of a second lens L2 having a plano-convex shape and a positive refractive power, and a third lens L3 having a plano-convex shape and a positive refractive power. The second lens L2 and the third lens L3 are cemented together through a contact multilayer type diffraction optical element DOE in which a diffraction optical surface configuring a diffraction grating DG is formed in an interface. The second lens L2 is an aspherical lens in which a lens surface on the eye point EP is formed in the aspherical shape. The third lens L3 is a Fresnel lens in which a second Fresnel surface FSb having the aspherical shape is formed on the lens surface on the image display unit 11.

The third lens group G3 comprises a fourth lens L4 having a meniscus shape and a positive refractive power. The fourth lens L4 is an aspherical lens in which lens surfaces on both sides are formed in the aspherical shape. The fourth lens L4 is arranged by having a concave surface facing the image display unit 11.

Table 1 below shows each specification in Example 1.

TABLE 1

[Specification Data]

f = 21.77
fDOE = 384.62
fR1 = 48.37
fR2 = 69.03
ω = ±60°
ER = 10.0
TL = 25.0

[Lens Data]

| Surface Number | R | D | nd | vd |
|---|---|---|---|---|
| 1 | ∞ | 1.0 | 1.4908 | 57.1 |
| 2*b | −23.73809 | 0.1 | | |
| 3*a | 94.2717 | 1.7 | 1.4908 | 57.1 |
| 4 | ∞ | 0.1 | 1.5571 | 49.7 |
| 5*c | ∞ | 0.1 | 1.5278 | 33.4 |
| 6 | ∞ | 1.0 | 1.4908 | 57.1 |
| 7*b | −33.8777 | 0.1 | | |
| 8*a | 23.21068 | 4.2 | 1.4908 | 57.1 |
| 9*a | 23.4219 | 16.7 | | |

[Aspherical Data]

The 2nd Surface

κ = 0.0000
A4 = −1.0506E−05, A6 = 1.1147E−07, A8 = −2.4011E−10, A10 = 2.4908E−13

The 3rd Surface

κ = −49.695049
A4 = −2.47387E−06, A6 = −3.30138E−08, A8 = 5.15408E−11, A10 = 1.65242E−14

TABLE 1-continued

The 7th Surface

κ = 0.0000
A4 = 5.91920E−06, A6 = −3.81010E−08, A8 = −1.16180E−10, A10 = 2.64530E−13

The 8th Surface

κ = 0.0000
A4 = −5.83107E−06, A6 = 2.52546E−07, A8 = −9.08748E−10, A10 = 6.64101E−13

The 9th Surface

κ = 0.0000
A4 = 1.65842E−06, A6 = 1.79802E−07, A8 = −8.37315E−10, A10 = 6.78955E−13

[Diffraction Optical Surface Data]

| Term | The 5th Surface Coefficient |
|---|---|
| C2 | −1.30E−03 |
| C4 | 1.30E−06 |

[Fresnel surface data]

| | First Fresnel Surface | Second Fresnel Surface |
|---|---|---|
| ASa | 0.8 | 1.1 |
| ASb | 0.6 | 0.6 |
| ASc | 0.4 | 0.3 |

[Conditional Expression Corresponding Value]

Conditional Expression (1) fR2/fR1 = 1.43
Conditional Expression (2) f/fDOE = 0.06
Conditional Expression (3) f/fR1 = 0.45
Conditional Expression (4) AS1 = 0.9
Conditional Expression (5) AS2 = 1.1

Figure 3:
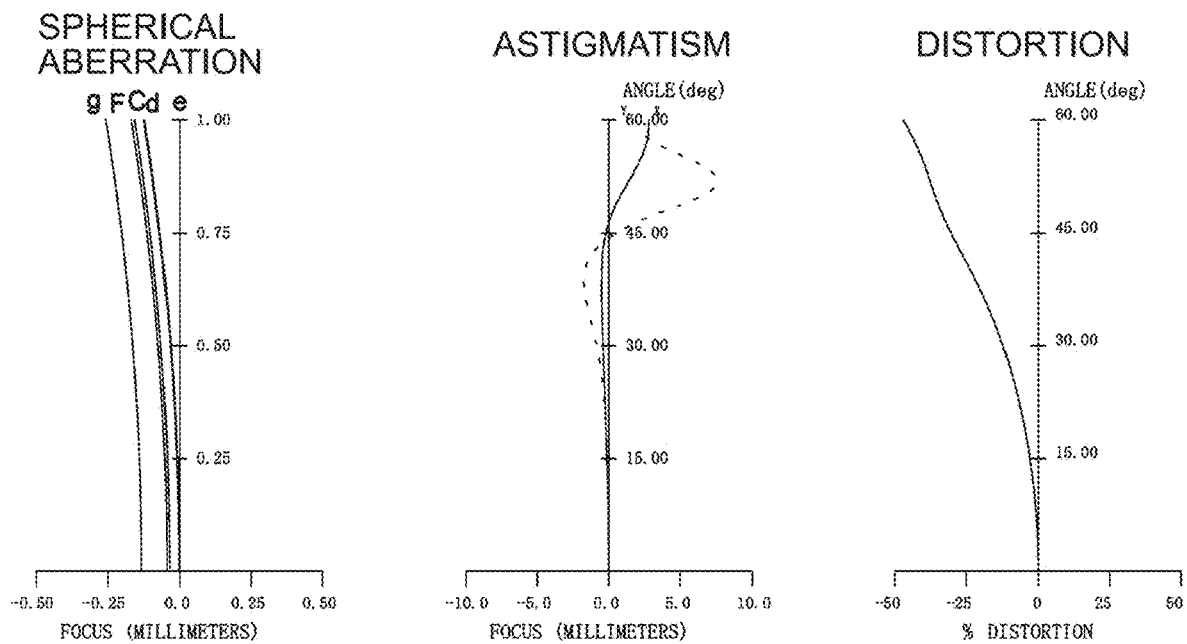
FIG. 3 shows various aberrations of the ocular optical system according to Example 1.
Figure 3:
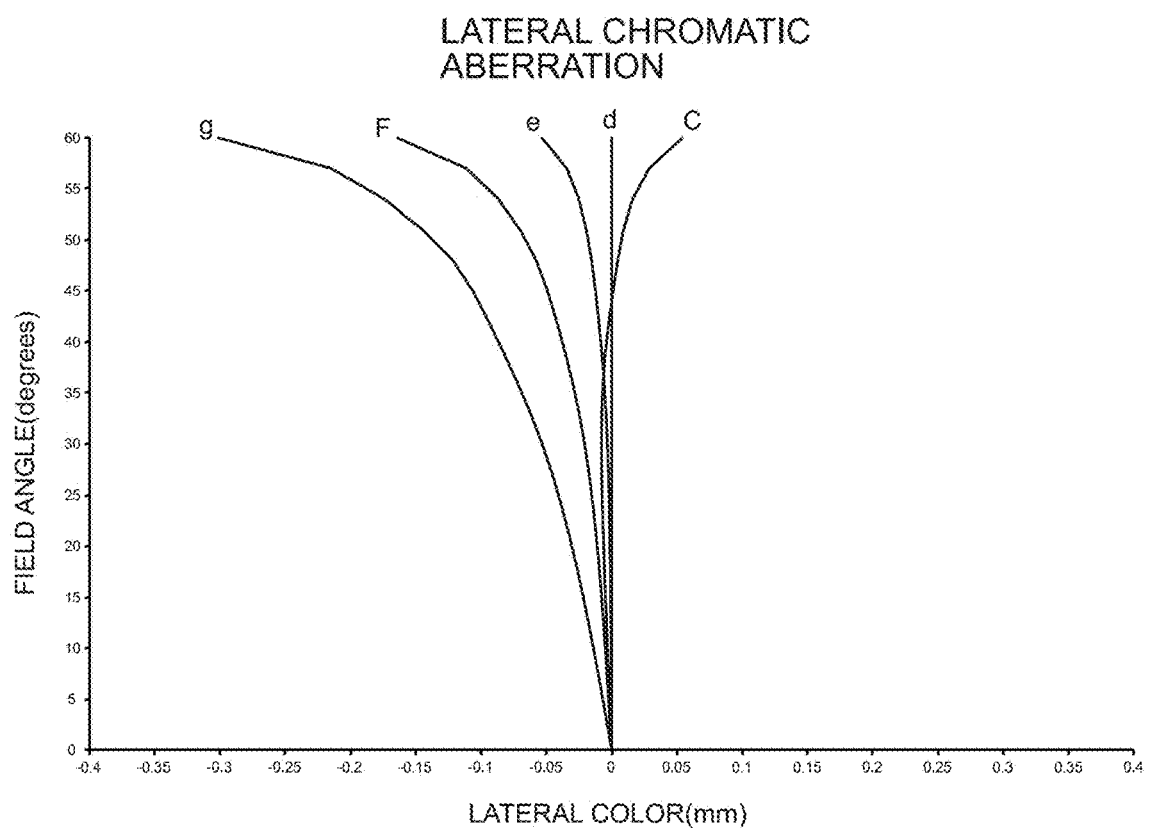
Figure 4:
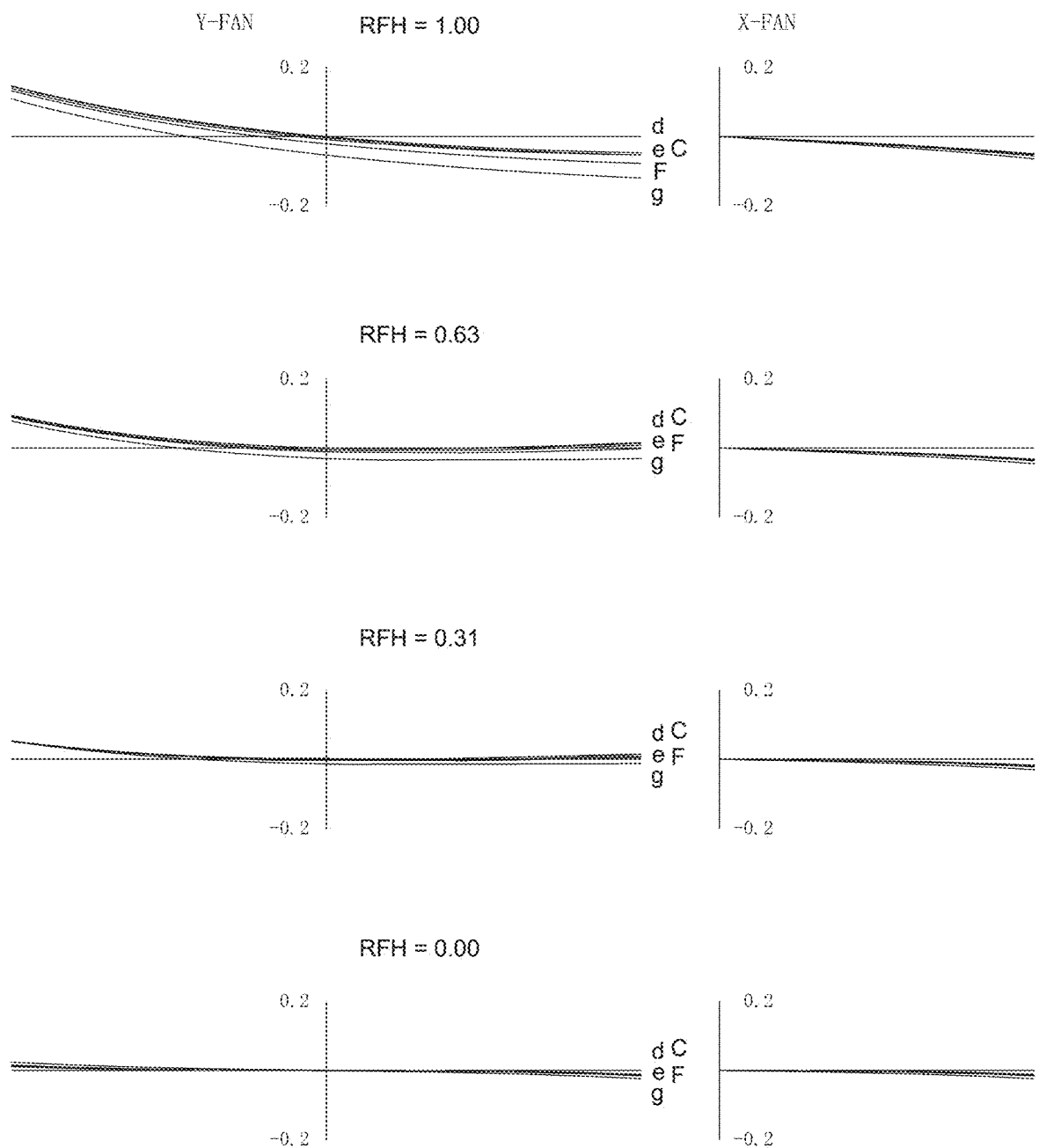
FIG. 4 shows lateral aberrations of the ocular optical system according to Example 1.
Figure 5:
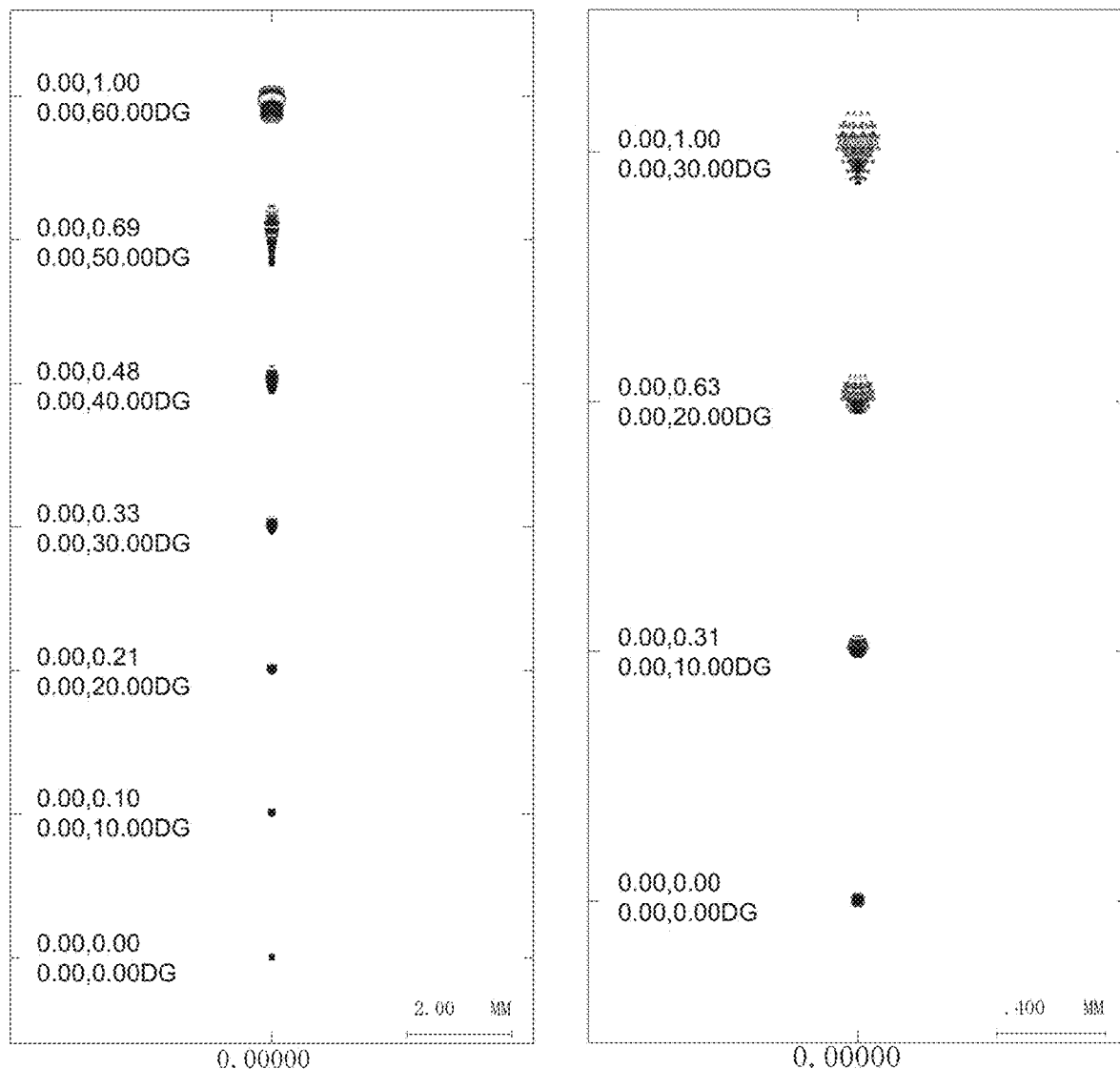
FIG. 5 shows spot diagrams of the ocular optical system according to Example 1.

FIG. 3 shows various aberrations of the ocular optical system according to Example 1. FIG. 4 shows lateral aberrations of the ocular optical system according to Example 1. FIG. 5 shows spot diagrams of the ocular optical system according to Example 1. In each aberration graph, d denotes a d-line (wavelength λ=587.6 nm), e denotes an e-line (wavelength λ=546.1 nm), g denotes a g-line (wavelength λ=435.8 nm), C denotes a C-line (wavelength λ=656.3 nm), and F denotes an F-line (wavelengthλ=486.1 nm), respectively. In an astigmatism graph, a solid line represents a sagittal image surface, and a dashed line represents a meridional image surface, respectively. In a lateral aberration graph, RFH denotes an image height ratio (Relative Field Height). In the spot diagram, a vertical axis represents a field position and a horizontal axis represents a defocusing value. It should be noted that, also in the aberration graph in each Example as shown below, the same symbol as in Example 1 is used, and the duplicate description will be omitted. Then, from each aberration graph, it is found that various aberrations are successfully corrected, and the ocular optical system has excellent imaging performance in Example 1.

Example 2

Figure 6:
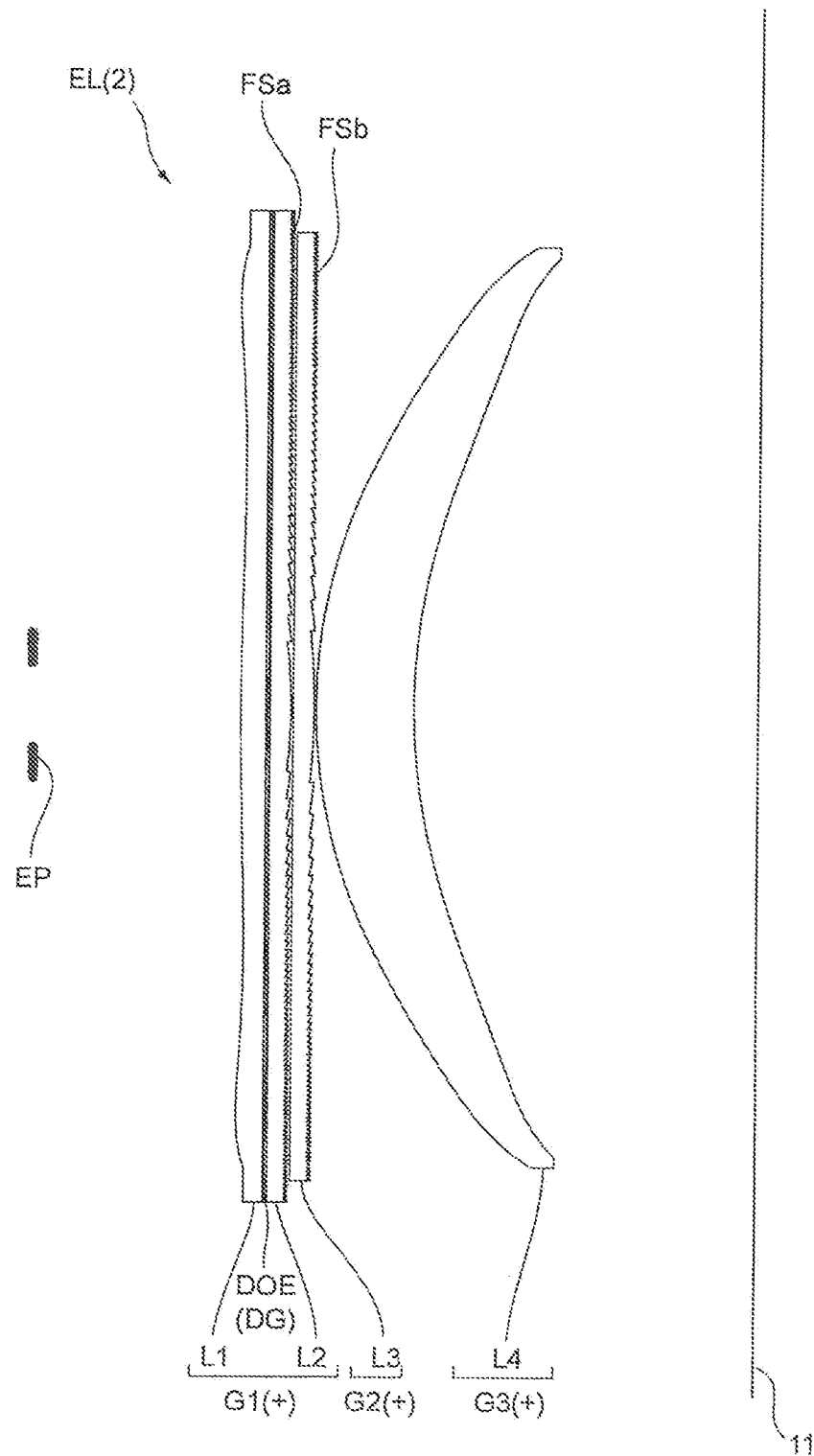
FIG. 6 shows a lens configuration of an ocular optical system according to Example 2.
Figure 7:
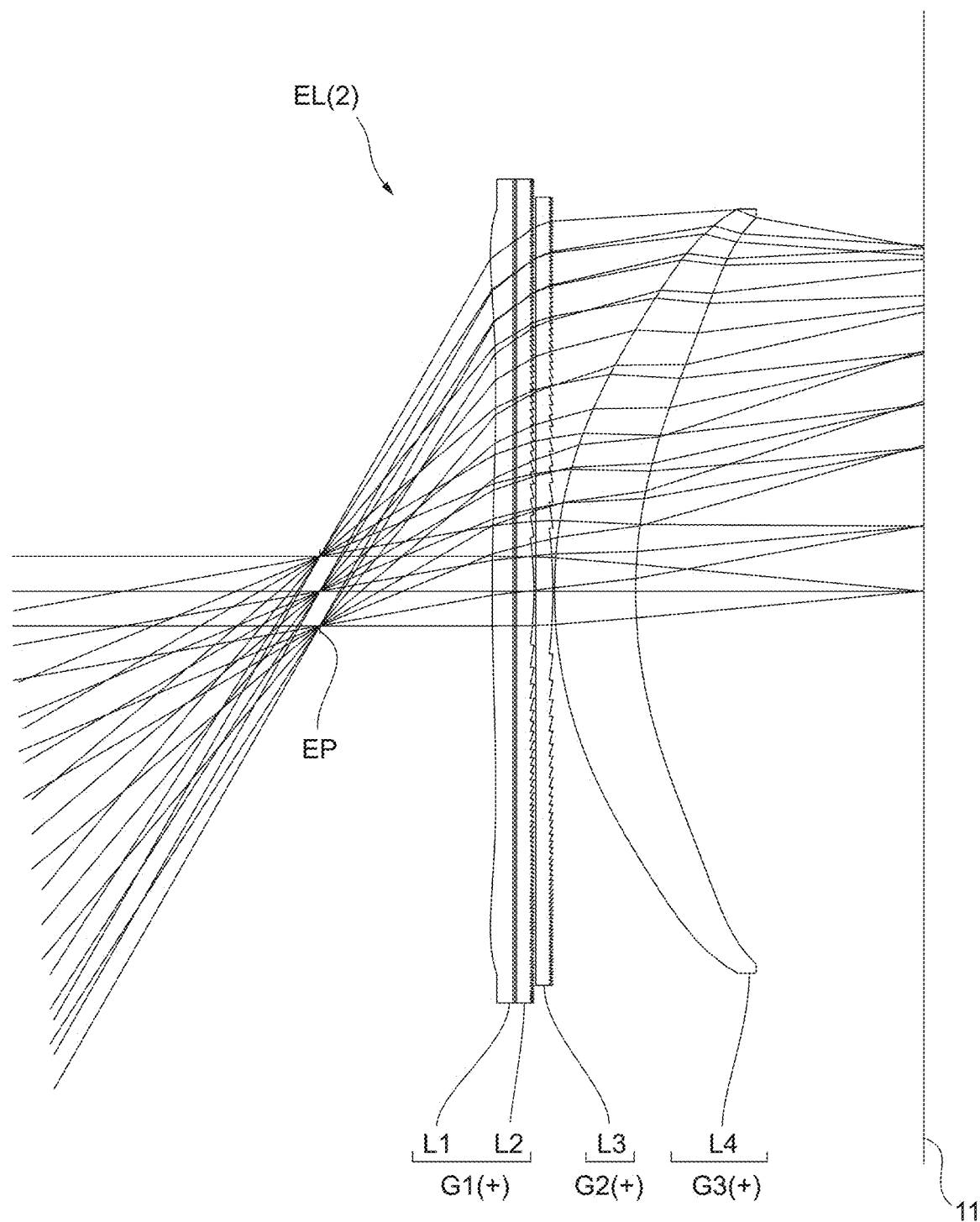
FIG. 7 shows optical paths of the ocular optical system according to Example 2.

Hereinafter, Example 2 of the present application will be described with reference to FIGS. 6 to 10 and Table 2. FIG. 6 shows a lens configuration of an ocular optical system EL(2) according to Example 2, and FIG. 7 shows optical paths of the ocular optical system EL(2) according to Example 2. The ocular optical system EL(2) according to Example 2 comprises, in order from an eye point EP, a first lens group G1 having a positive refractive power, a second lens group G2 having a positive refractive power, and a third lens group G3 having a positive refractive power.

The first lens group G1 comprises a cemented positive lens formed of a first lens L1 having a plano-convex shape and a positive refractive power, and a second lens L2 having a plano-convex shape and a positive refractive power. The first lens L1 and the second lens L2 are cemented together through a contact multilayer type diffraction optical element DOE in which a diffraction optical surface configuring a diffraction grating DG is formed in an interface. The first lens L1 is an aspherical lens in which a lens surface on the eye point EP is formed in an aspherical shape. The second lens L2 is a Fresnel lens in which a first Fresnel surface FSa having the aspherical shape is formed on a lens surface on an image display unit 11.

The second lens group G2 comprises a third lens L3 having a plano-convex shape and a positive refractive power. The third lens L3 is a Fresnel lens in which a second Fresnel surface FSb having the aspherical shape is formed on a lens surface on the image display unit 11.

The third lens group G3 comprises a fourth lens L4 having a meniscus shape and a positive refractive power. The fourth lens L4 is an aspherical lens in which lens surfaces on both sides are formed in the aspherical shape. The fourth lens L4 is arranged by having a concave surface facing the image display unit 11.

Table 2 below shows each specification in Example 2.

TABLE 2

[Specification Data]

f = 21.45
fDOE = 235.86
fR1 = 49.44
fR2 = 66.94
ω = ±60°
ER = 10.0
TL = 25.0

[Lens Data]

| Surface Number | R | D | nd | vd |
|---|---|---|---|---|
| 1*a | 171.06597 | 1.2 | 1.4908 | 57.1 |
| 2 | ∞ | 0.1 | 1.5571 | 49.7 |
| 3*c | ∞ | 0.1 | 1.5278 | 33.4 |
| 4 | ∞ | 1.0 | 1.4908 | 57.1 |
| 5*b | −24.26514 | 0.1 | | |
| 6 | ∞ | 1.0 | 1.4908 | 57.1 |
| 7*b | −32.85648 | 0.1 | | |
| 8*a | 26.0383 | 4.7 | 1.4908 | 57.1 |
| 9*a | 28.73545 | 16.7 | | |

[Aspherical Data]

The 1st Surface

κ = 0.0000
A4 = −9.3810E−06, A6 = −1.5637E−08, A8 = 3.1846E−11, A10 = 3.9767E−14

The 5th Surface

κ = 0.0000
A4 = −4.50010E−06, A6 = 1.42080E−08, A8 = −7.01920E−12, A10 = 7.90970E−14

The 7th Surface

κ = 0.0000
A4 = 6.43360E−07, A6 = 5.07060E−09, A8 = −1.21920E−10, A10 = 1.68810E−13

The 8th Surface

κ = 0.0000
A4 = 4.04288E−06, A6 = 1.78012E−08, A8 = −2.91991E−10, A10 = 4.35850E−13

The 9th Surface

κ = 0.0000
A4 = 5.64153E−06, A6 = −9.48474E−08, A8 = 5.62078E−11, A10 = 1.38325E−13

[Diffraction Optical Surface Data]

| Term | The 3rd Surface Coefficient |
|---|---|
| C2 | −2.11990E−03 |
| C4 | 4.22250E−06 |
| C6 | −1.13570E−08 |
| C8 | 3.25700E−11 |
| C10 | −3.44010E−14 |

[Fresnel Surface Data]

| | First Fresnel Surface | Second Fresnel Surface |
|---|---|---|
| ASa | 1.0 | 1.1 |
| ASb | 0.7 | 0.5 |
| ASc | 0.5 | 0.3 |

[Conditional Expression Corresponding Value]

Conditional Expression (1) fR2/fR1 = 1.35
Conditional Expression (2) f/fDOE = 0.09
Conditional Expression (3) f/fR1 = 0.43
Conditional Expression (4) AS1 = 1.0
Conditional Expression (5) AS2 = 1.1

Figure 8:
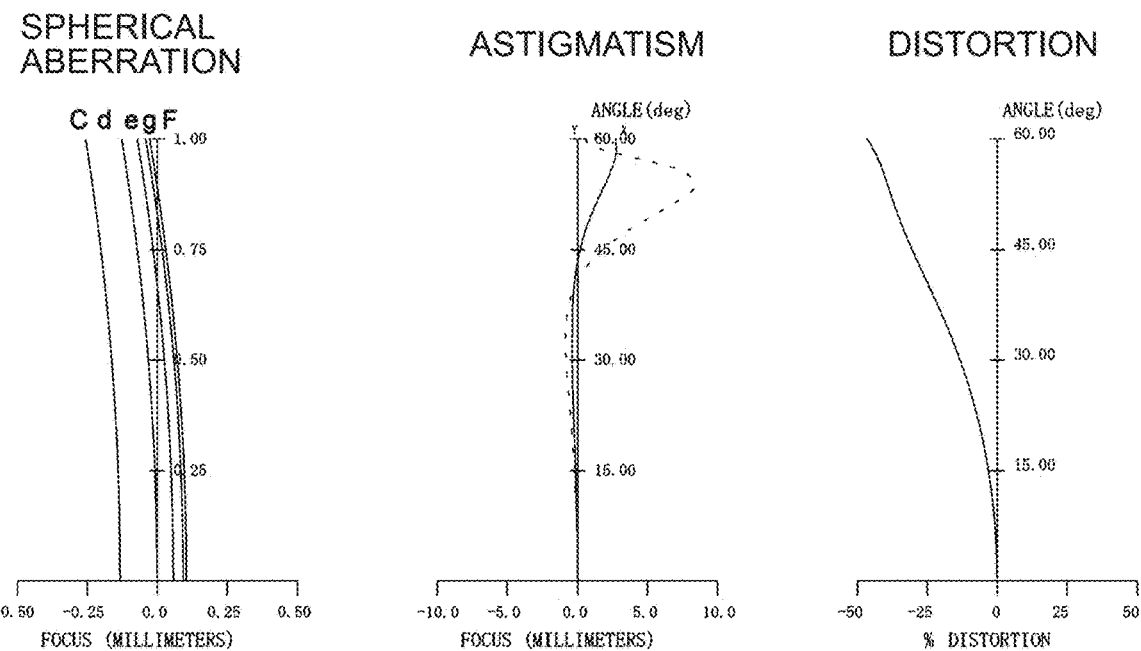
FIG. 8 shows various aberrations of the ocular optical system according to Example 2.
Figure 8:
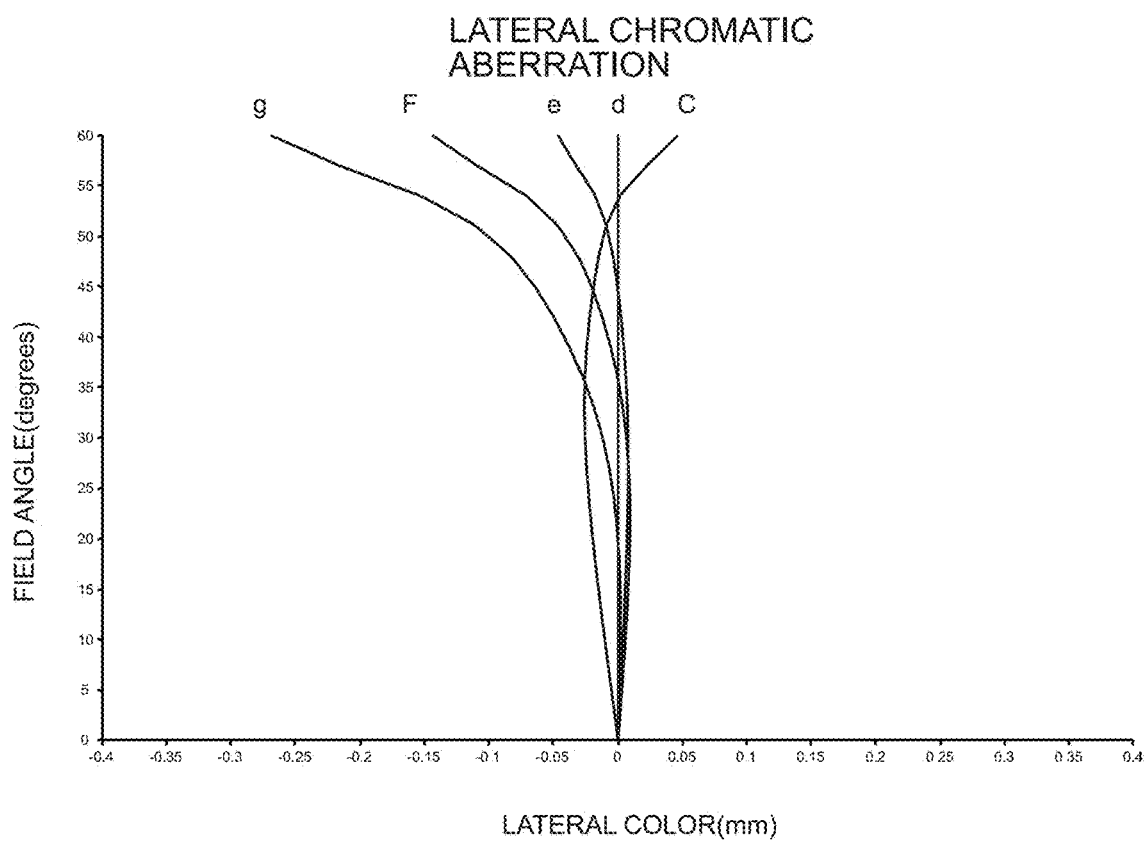
Figure 9:
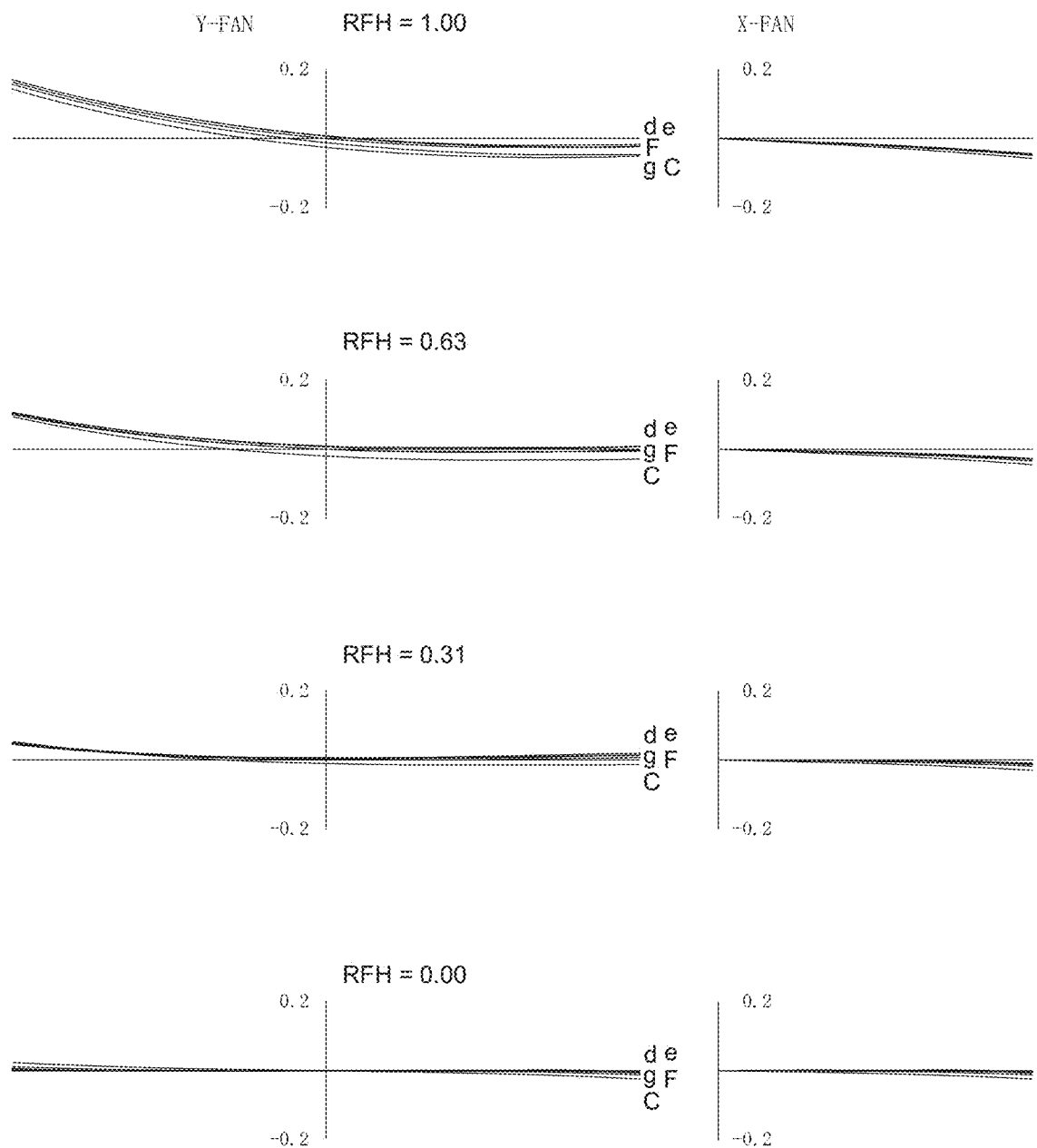
FIG. 9 shows lateral aberrations of the ocular optical system according to Example 2.
Figure 10:
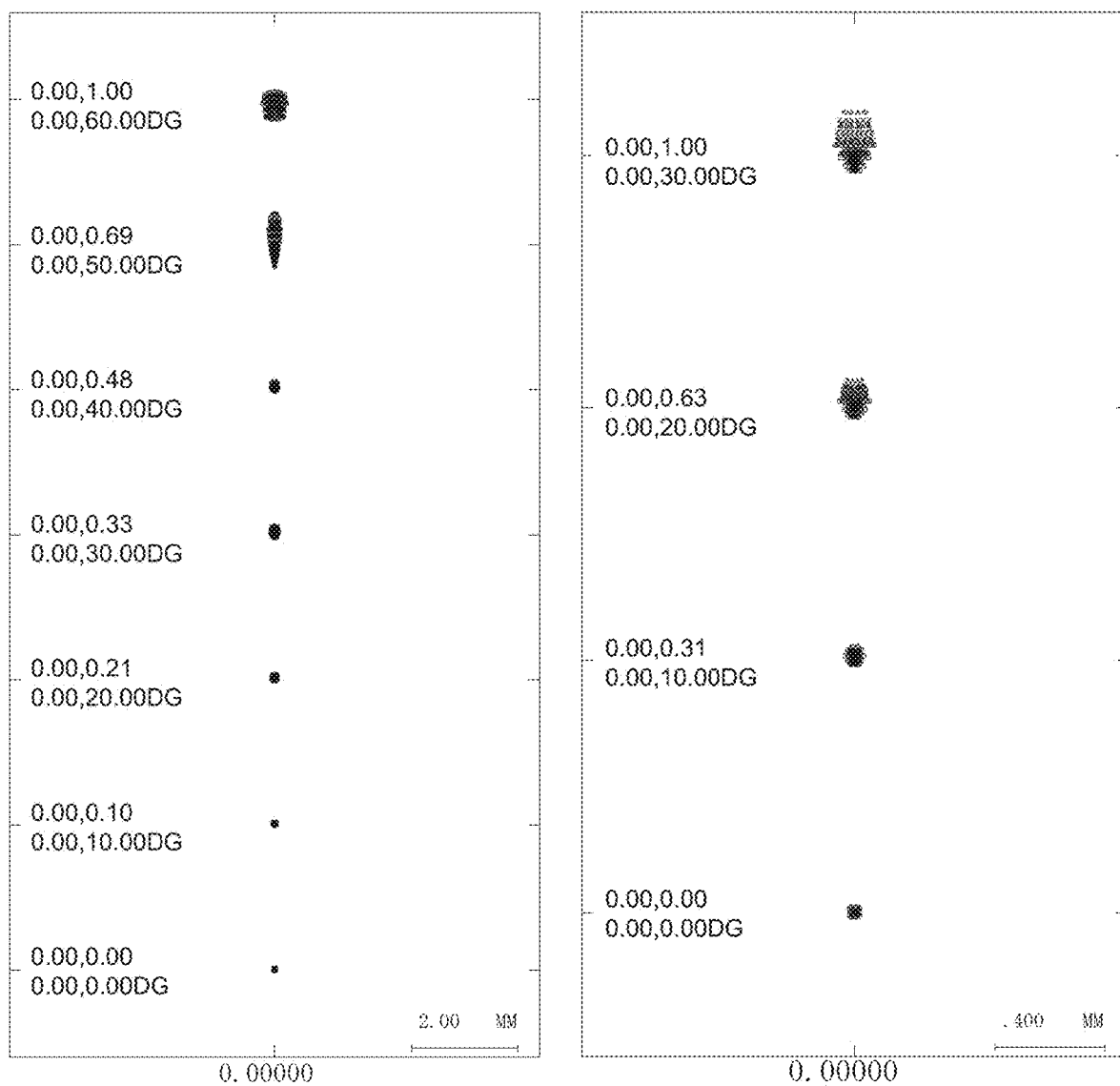
FIG. 10 shows spot diagrams of the ocular optical system according to Example 2.

FIG. 8 shows various aberrations of the ocular optical system according to Example 2. FIG. 9 shows lateral aberrations of the ocular optical system according to Example 2. FIG. 10 shows spot diagrams of the ocular optical system according to Example 2. Then, from each aberration graph, it is found that various aberrations are successfully corrected, and the ocular optical system has excellent imaging performance in Example 2.

Example 3

Figure 11:
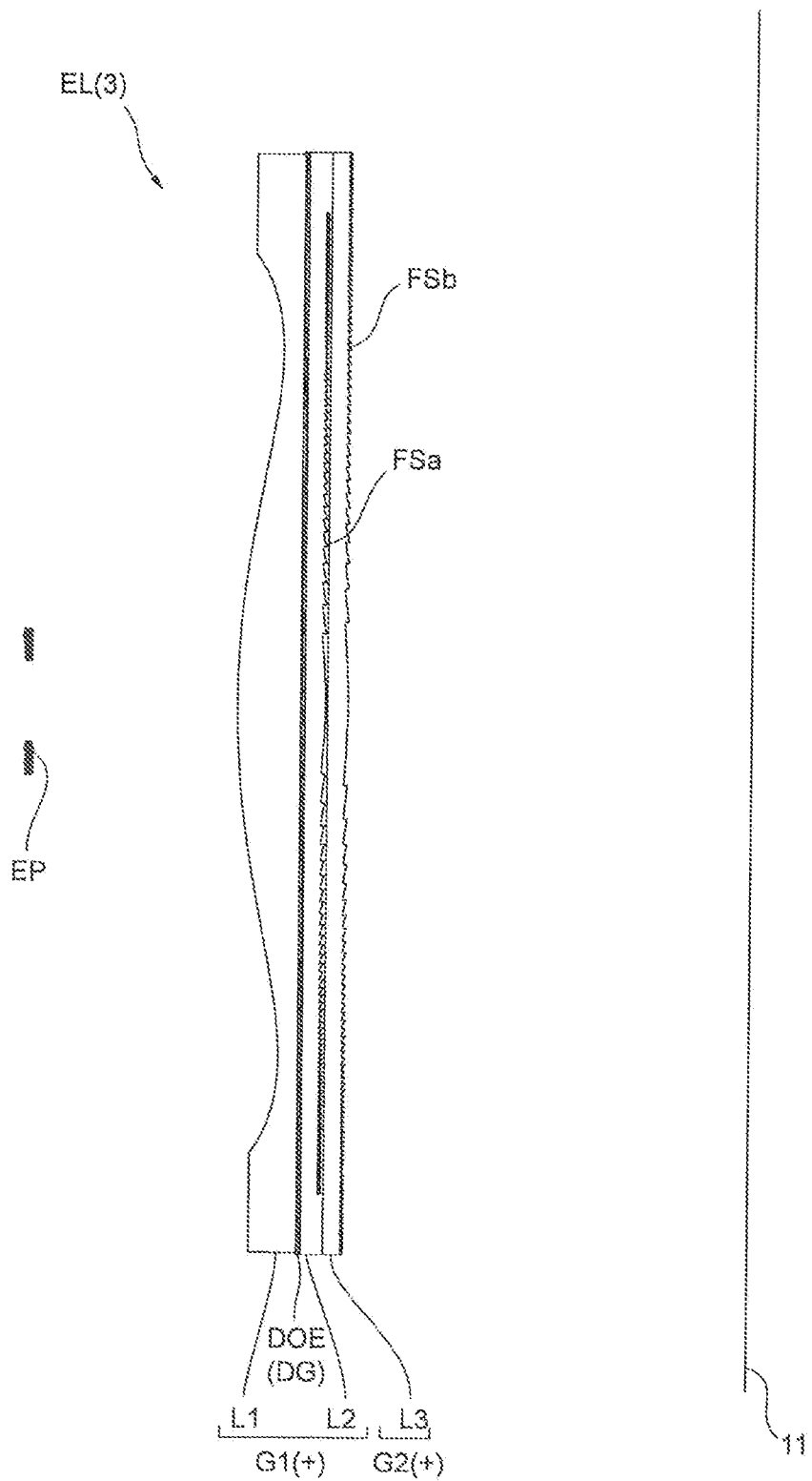
FIG. 11 shows a lens configuration of an ocular optical system according to Example 3.
Figure 12:
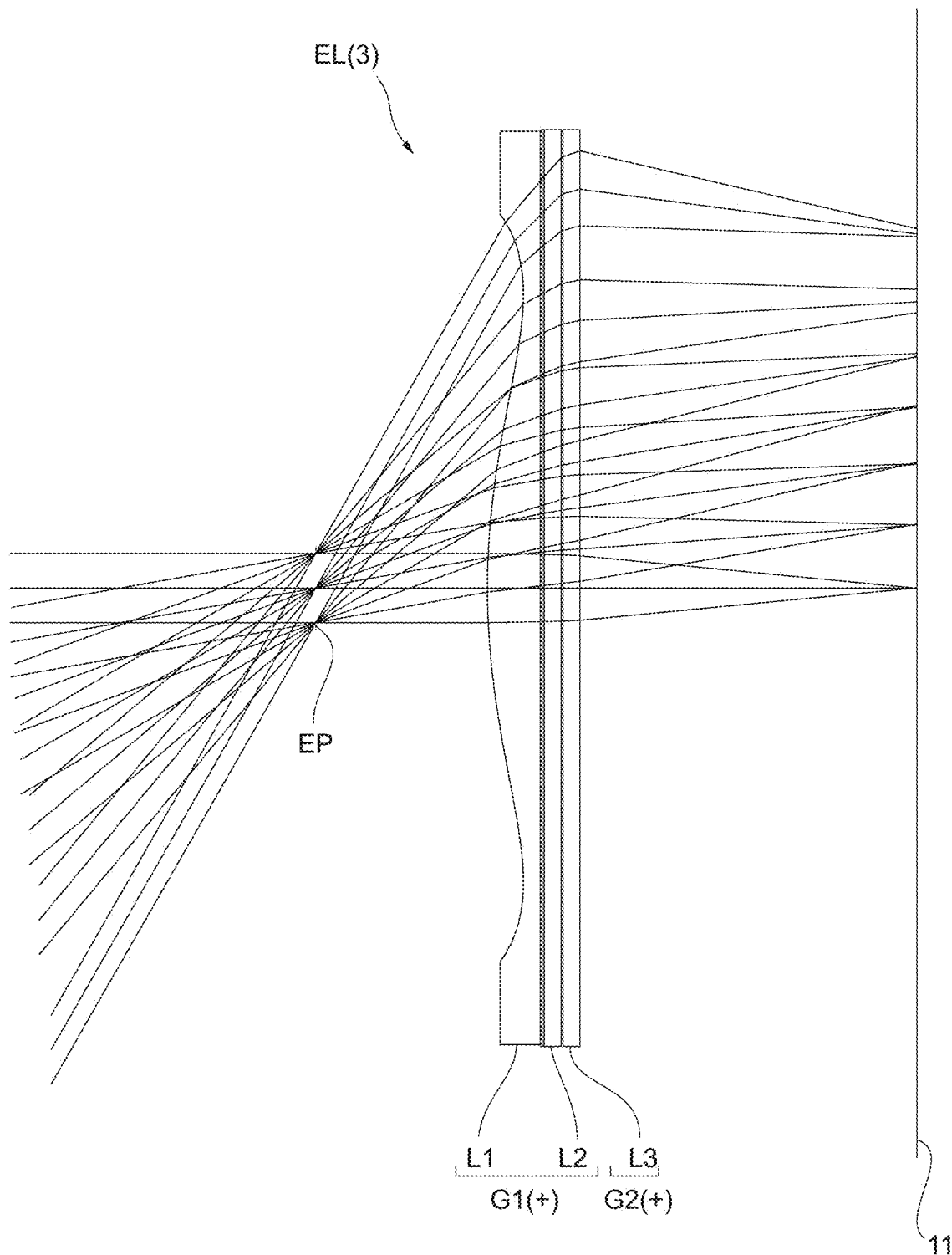
FIG. 12 shows optical paths of the ocular optical system according to Example 3.

Hereinafter, Example 3 of the present application will be described with reference to FIGS. 11 to 15 and Table 3. FIG. 11 shows a lens configuration of an ocular optical system EL(3) according to Example 3, and FIG. 12 shows optical paths of the ocular optical system EL(3) according to Example 3. The ocular optical system EL(3) comprises, in order from an eye point EP, a first lens group G1 having a positive refractive power, and a second lens group G2 having a positive refractive power.

The first lens group G1 comprises a cemented positive lens formed of a first lens L1 having a plano-convex shape and a positive refractive power, and a second lens L2 having a plano-convex shape and a positive refractive power. The first lens L1 and the second lens L2 are cemented together through a contact multilayer type diffraction optical element DOE in which a diffraction optical surface configuring a diffraction grating DG is formed in an interface. The first lens L1 is an aspherical lens in which a lens surface on an eye point EP is formed in an aspherical shape. The second lens L2 is a Fresnel lens in which a first Fresnel surface FSa having the aspherical shape is formed on a lens surface on an image display unit 11.

The second lens group G2 comprises a third lens L3 having a plano-convex shape and a positive refractive power. The third lens L3 is a Fresnel lens in which a second Fresnel surface FSb having the aspherical shape is formed on a lens surface on the image display unit 11.

Table 3 below shows each specification in Example 3.

TABLE 3

| [Specification Data] |
|---| f = 20.97
fDOE = 257.85
fR1 = 43.83
fR2 = 72.26
ω = ±60°
ER = 10.0
TL = 25.0

| [Lens Data] | | | | |
|---|---|---|---|---|
| Surface Number | R | D | nd | νd |
| 1*a | 42.09260 | 3.08 | 1.5346 | 56.3 |
| 2 | ∞ | 0.1 | 1.5571 | 49.7 |
| 3*c | ∞ | 0.1 | 1.5278 | 33.4 |
| 4 | ∞ | 1.0 | 1.5346 | 56.3 |
| 5*b | −28.14944 | 0.1 | | |
| 6 | ∞ | 1.0 | 1.5346 | 56.3 |
| 7*b | −38.63184 | 19.62 | | |

| [Aspherical Data] |
|---|

The 1st Surface

κ = 0.0000
A4 = −1.1562E−05, A6 = −4.6672E−09, A8 = −8.5258E−11, A10 = 8.8321E−14

The 5th Surface

κ = 0.0000
A4 = 8.89510E−06, A6 = −3.17262E−08, A8 = 3.91456E−11, A10 = −7.09111E−14

The 7th Surface

κ = 0.0000
A4 = −4.00176E−06, A6 = −6.79858E−09, A8 = 5.11130E−12, A10 = 3.43115E−15

| [Diffraction Optical Surface Data] | |
|---|---|
| Term | The 3rd Surface Coefficient |
| C2 | −1.93909E−03 |
| C4 | 3.73947E−07 |
| C6 | 1.17762E−08 |
| C8 | −2.33673E−11 |
| C10 | 1.27610E−14 |

TABLE 3-continued

[Fresnel Surface Data]

|  | First Fresnel Surface | Second Fresnel Surface |
|---|---|---|
| ASa | 4.0 | 1.2 |
| ASb | 0.8 | 0.6 |
| ASc | 0.4 | 0.4 |

[Conditional Expression Corresponding Value]

Conditional Expression (1) fR2/fR1 = 1.65
Conditional Expression (2) f/fDOE = 0.08
Conditional Expression (3) f/fR1 = 0.48
Conditional Expression (4) AS1 = 4.3
Conditional Expression (5) AS2 = 1.9

Figure 13:
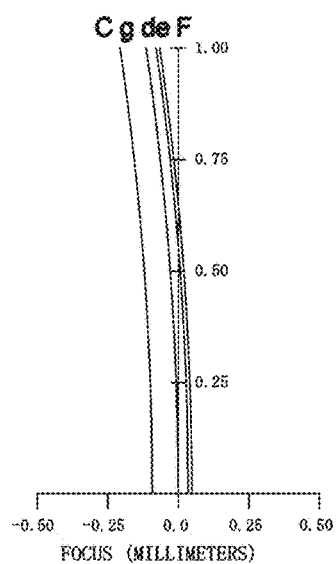
FIG. 13 shows various aberrations of the ocular optical system according to Example 3.
Figure 13:
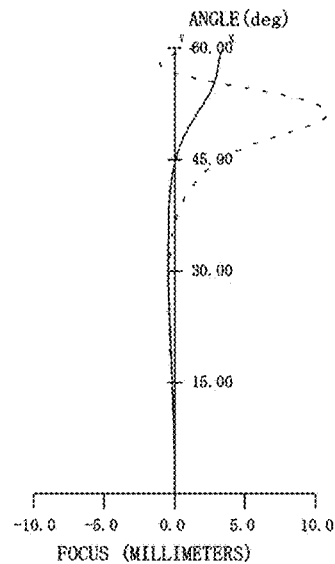
Figure 13:
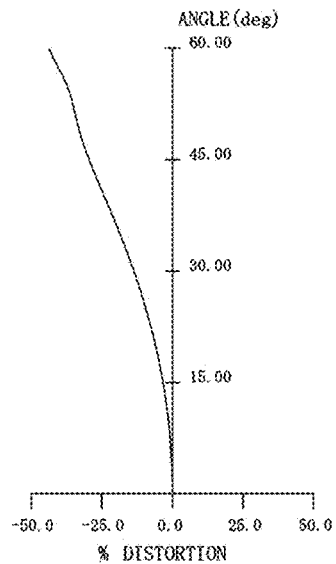
Figure 13:
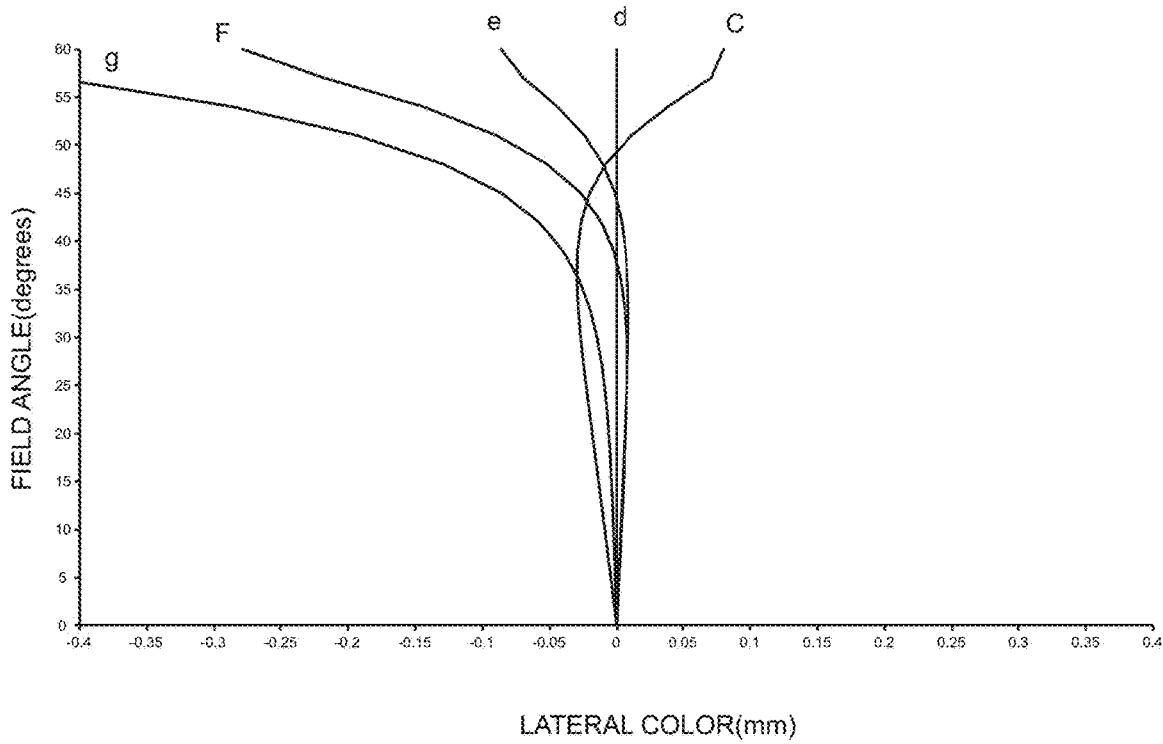
Figure 14:
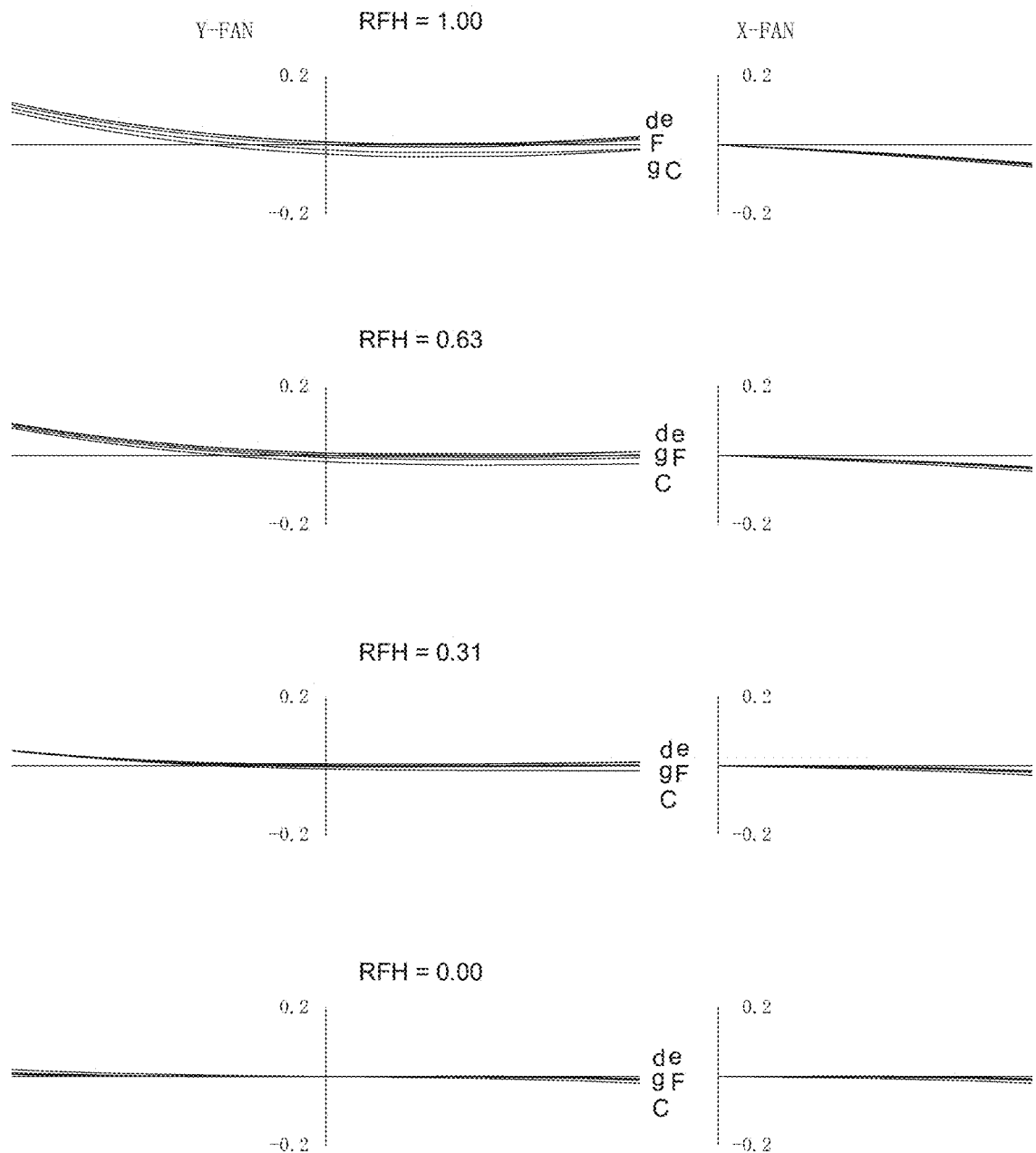
FIG. 14 shows lateral aberrations of the ocular optical system according to Example 3.
Figure 15:
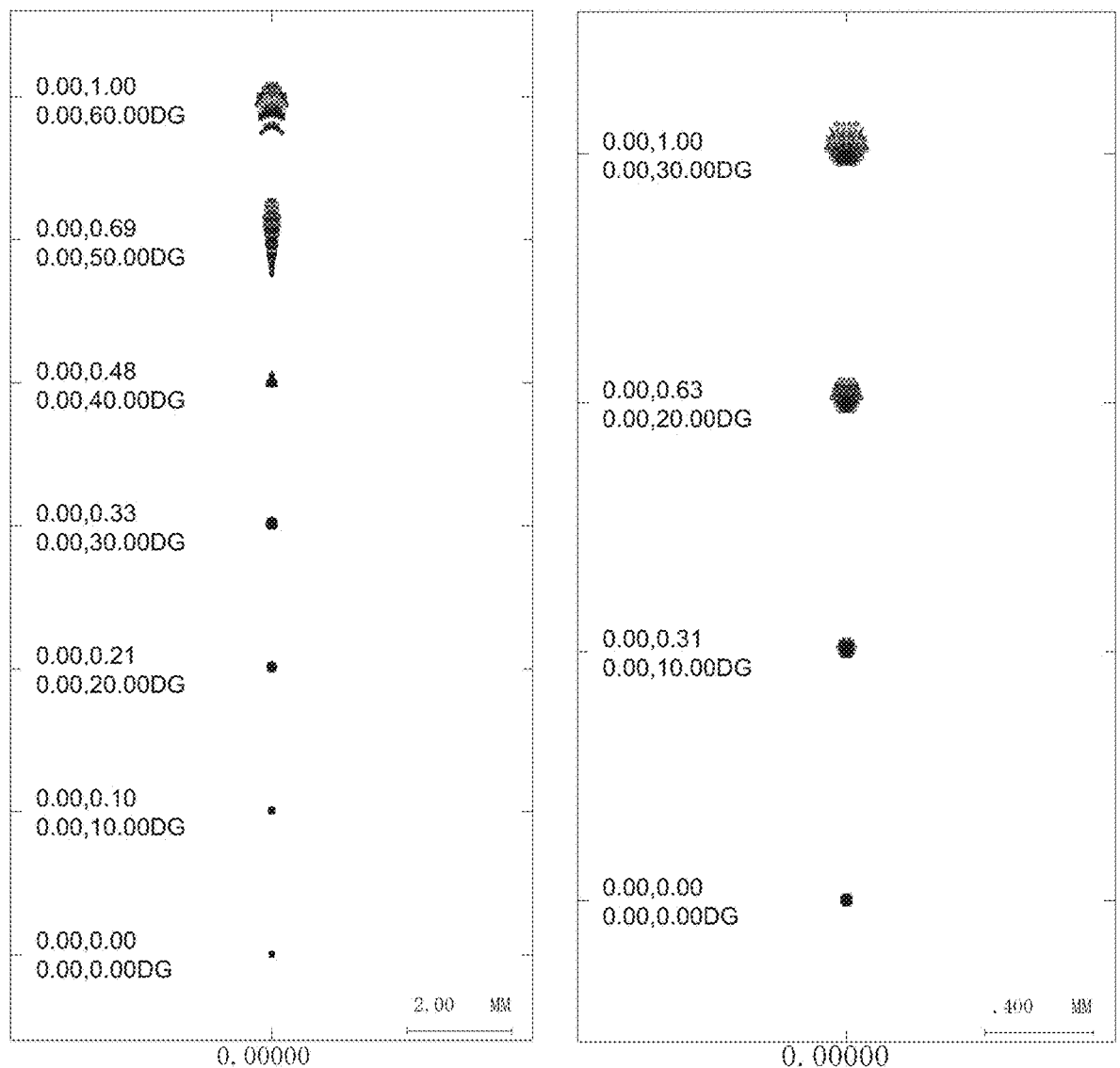
FIG. 15 shows spot diagrams of the ocular optical system according to Example 3.

FIG. 13 shows various aberrations of the ocular optical system according to Example 3. FIG. 14 shows lateral aberrations of the ocular optical system according to Example 3. FIG. 15 shows spot diagrams of the ocular optical system according to Example 3. Then, from each aberration graph, it is found that various aberrations are successfully corrected, and the ocular optical system has excellent imaging performance in Example 3.

Example 4

Figure 16:
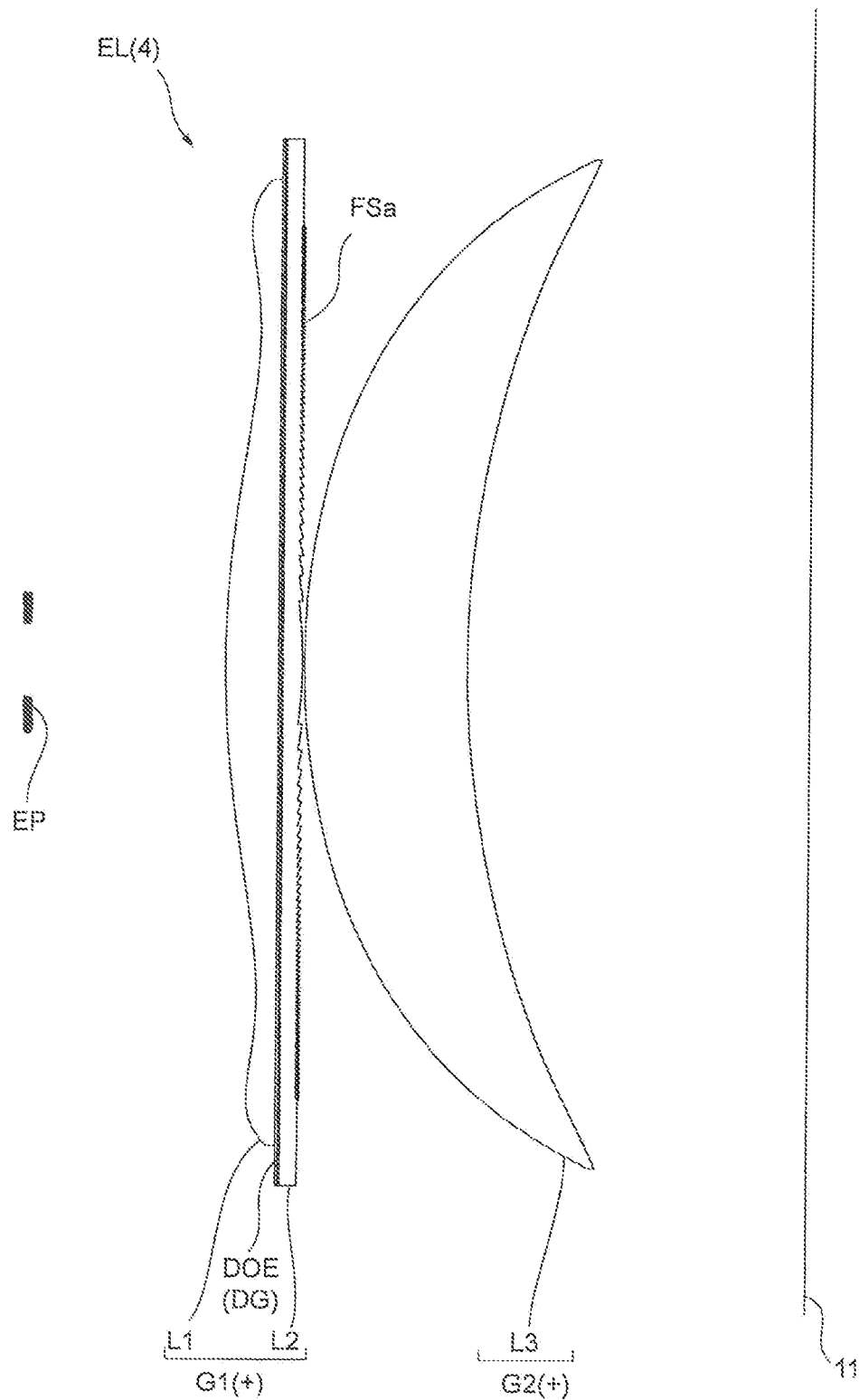
FIG. 16 shows a lens configuration of an ocular optical system according to Example 4.
Figure 17:
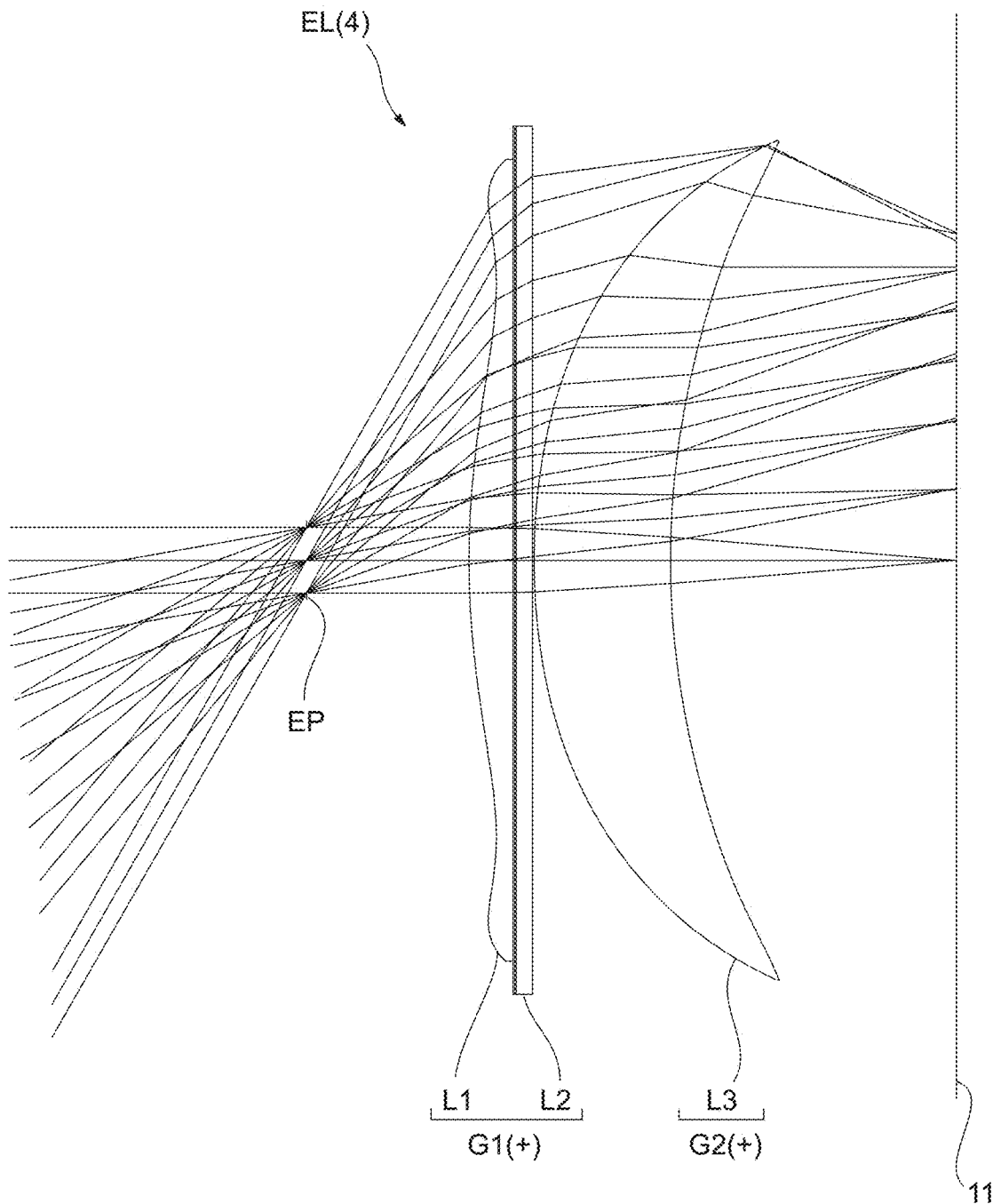
FIG. 17 shows optical paths of the ocular optical system according to Example 4.

Hereinafter, Example 4 of the present application will be described with reference to FIGS. 16 to 20 and Table 4. FIG. 16 shows a lens configuration of an ocular optical system EL(4) according to Example 4, and FIG. 17 shows optical paths of the ocular optical system (EL4) according to Example 4. The ocular optical system EL(4) according to Example 4 comprises, in order from an eye point EP, a first lens group G1 having a positive refractive power, and a second lens group G2 having a positive refractive power.

The first lens group G1 comprises a cemented positive lens formed of a first lens L1 having a plano-convex shape and a positive refractive power, and a second lens L2 having a plano-convex shape and a positive refractive power. The first lens L1 and the second lens L2 are cemented together through a contact multilayer type diffraction optical element DOE in which a diffraction optical surface configuring a diffraction grating DG is formed in an interface. The first lens L1 is an aspherical lens in which a lens surface on the eye point EP is formed in an aspherical shape. The second lens L2 is a Fresnel lens in which a first Fresnel surface FSa having the aspherical shape is formed on a lens surface on an image display unit 11.

The second lens group G2 comprises a third lens L3 having a meniscus shape and a positive refractive power. The third lens L3 is an aspherical lens in which lens surfaces on both sides are formed in the aspherical shape. The third lens L3 is arranged by having a concave surface facing the image display unit 11.

Table 4 below shows each specification in Example 4.

TABLE 4

[Specification Data]

f = 24.92
fDOE = 381.01
fR1 = 45.33
ω = ±60°
ER = 10.0
TL = 30.0

[Lens Data]

| Surface Number | R | D | nd | νd |
|---|---|---|---|---|
| 1*a | 50.96530 | 2.71 | 1.5346 | 56.3 |
| 2 | ∞ | 0.1 | 1.5571 | 49.7 |
| 3*c | ∞ | 0.1 | 1.5278 | 33.4 |
| 4 | ∞ | 1.0 | 1.5346 | 56.3 |
| 5*b | −24.23359 | 0.1 | | |
| 6*a | 38.79071 | 8.39 | 1.5346 | 56.3 |
| 7*a | 49.05119 | 17.60 | | |

[Aspherical Data]

The 1st Surface

κ = 0.777552736
A4 = −1.0033E−05, A6 = −2.7721E−09, A8 = −8.8993E−11, A10 = 9.1365E−14
The 5th Surface κ = 0.0000
A4 = 1.55037E−05, A6 = −4.11524E−08, A8 = 2.83502E−11, A10 = −1.06404E−13

TABLE 4-continued

The 6th Surface

κ = 0.0000
A4 = 7.69796E−06, A6 = 1.04884E−08, A8 = −3.21843E−11, A10 = 4.04558E−14

The 7th Surface

κ = 0.0000
A4 = −1.53344E−06, A6 = −8.23749E−09, A8 = 1.95494E−11, A10 = 1.50775E−14

[Diffraction Optical Surface Data]

| Term | The 3rd Surface Coefficient |
|---|---|
| C2 | −1.31230E−03 |
| C4 | −2.17308E−06 |
| C6 | 1.59697E−08 |
| C8 | −2.77754E−11 |
| C10 | 1.52831E−14 |

[Fresnel Surface Data]

| | First Fresnel Surface |
|---|---|
| ASa | 3.0 |
| ASb | 0.8 |
| ASc | 0.5 |

[Conditional Expression Corresponding Value]

Conditional Expression (2) f/fDOE = 0.07
Conditional Expression (3) f/fR1 = 0.55
Conditional Expression (4) AS1 = 3.1

Figure 18:
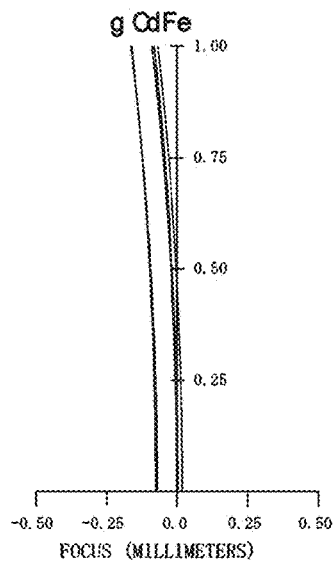
FIG. 18 shows various aberrations of the ocular optical system according to Example 4.
Figure 18:
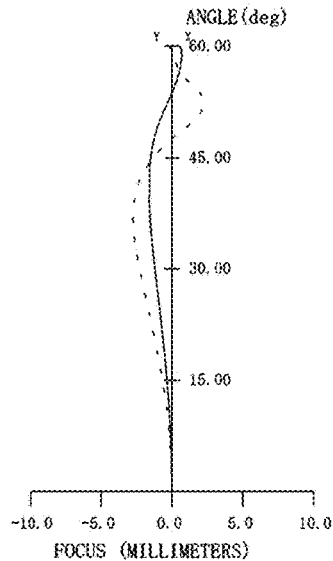
Figure 18:
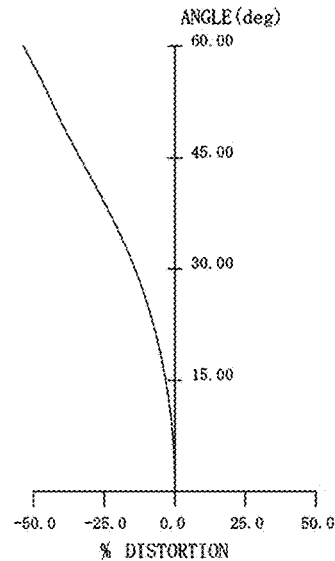
Figure 18:
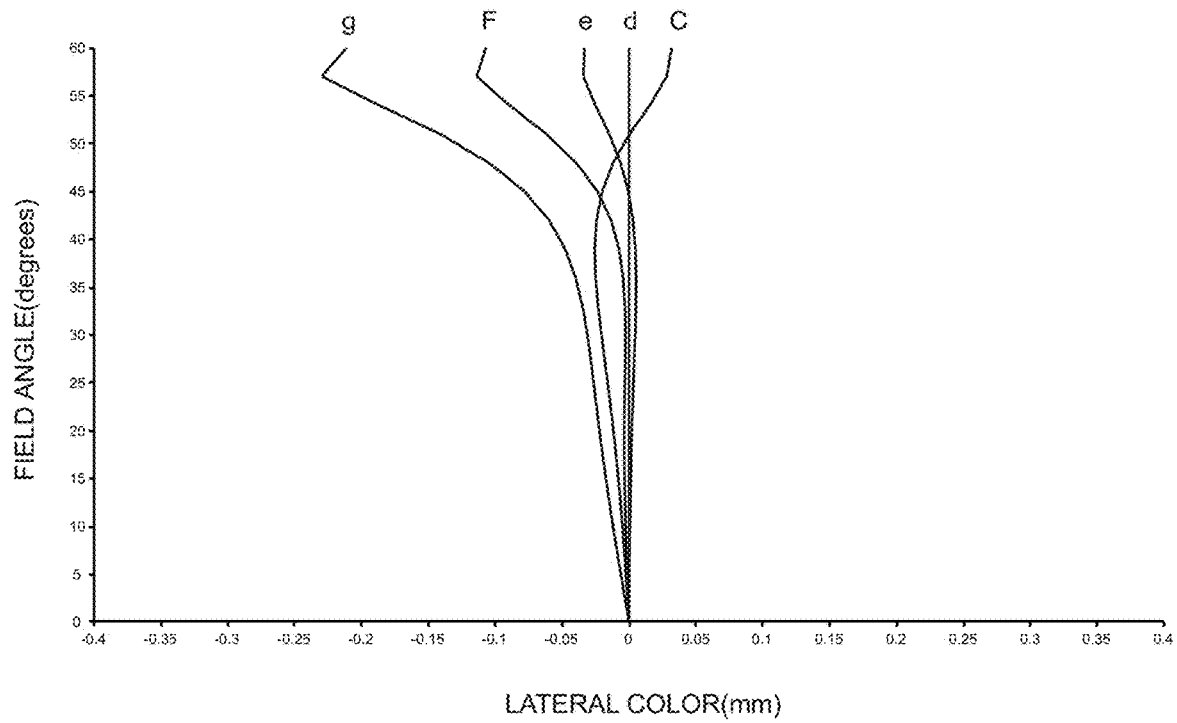
Figure 19:
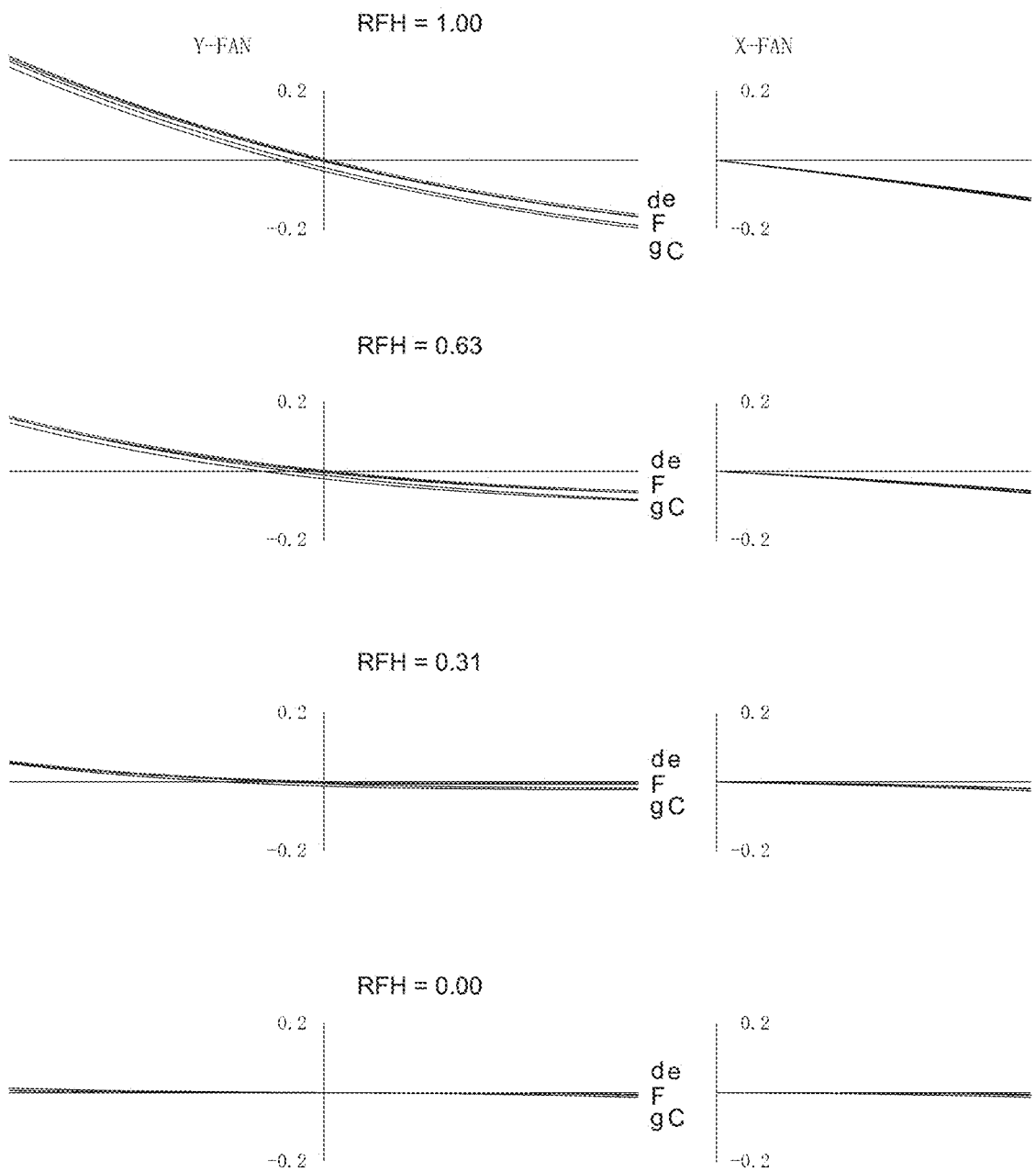
FIG. 19 shows lateral aberrations of the ocular optical system according to Example 4.
Figure 20:
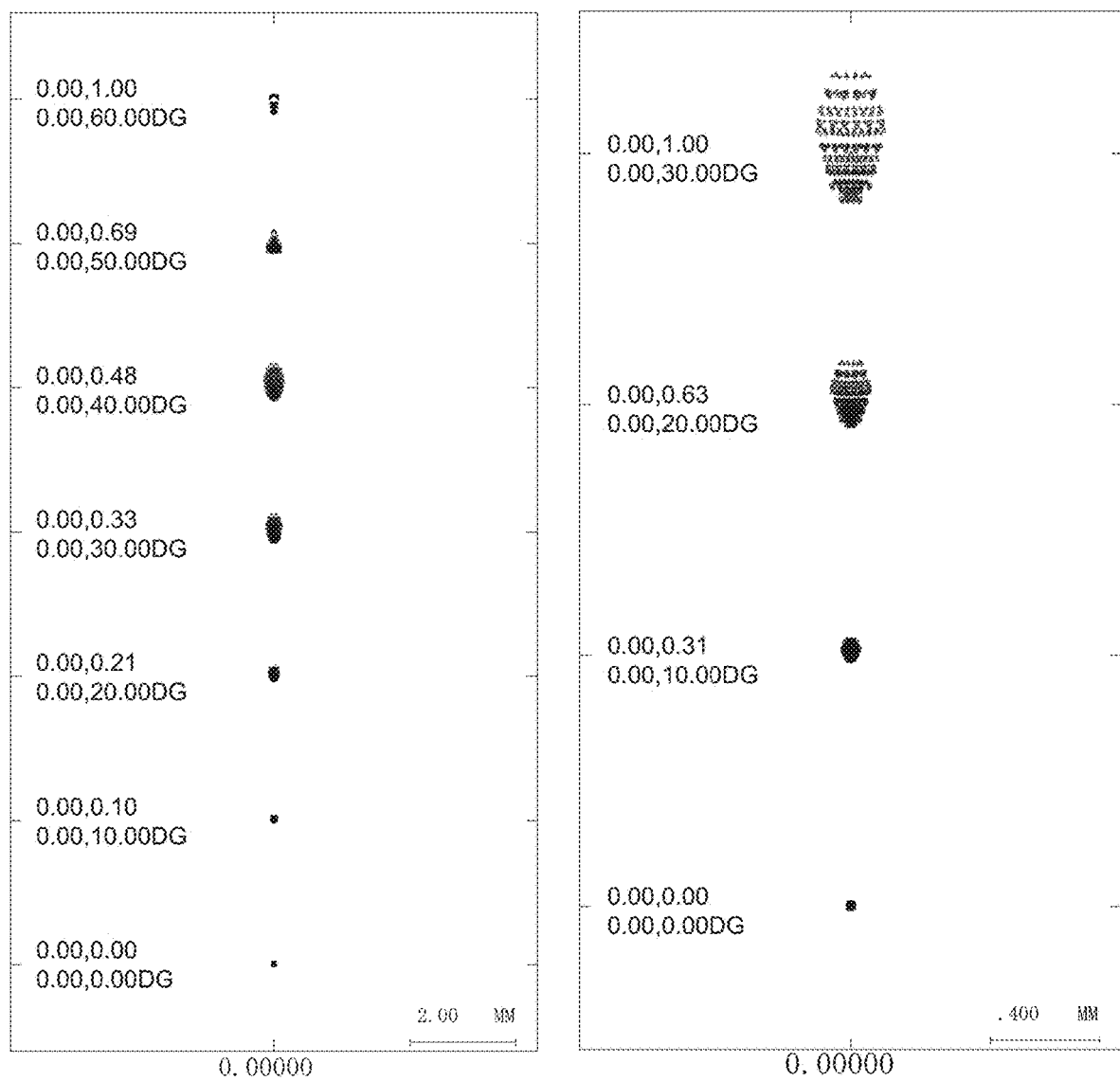
FIG. 20 shows spot diagrams of the ocular optical system according to Example 4.

FIG. 18 shows various aberrations of the ocular optical system according to Example 4. FIG. 19 shows lateral aberrations of the ocular optical system according to Example 4. FIG. 20 shows spot diagrams of the ocular optical system according to Example 4. Then, from each aberration graph, it is found that various aberrations are successfully corrected, and the ocular optical system has excellent imaging performance in Example 4.

As described above, according to each Example, even with a low-profile type, the ocular optical system which has a wide viewing angle, in which various aberrations such as a chromatic aberration are successfully corrected, can be realized.

As numerical Examples of the ocular optical system according to the present embodiments, the ocular optical system of two lens group and three lens group configurations has been described. However, the present application is not limited thereto, and ocular optical systems having other lens group configurations (a four lens group, for example) can also be configured. Specifically, the ocular optical system may have a configuration in which a lens or a lens group is added to a place closest to an object or an image surface of the ocular optical system according to the present embodiments.

The lens surface may be formed of a spherical surface or a flat surface, or an aspherical surface. When the lens surface is spherical or flat, lens processing and assembly adjustment are facilitated, and deterioration of optical performance caused by an error in processing and assembly adjustment can be prevented.

When the lens surface is aspherical, the aspherical surface may be any of an aspherical surface by grinding, a glass mold aspherical surface in which a glass is formed in the aspherical shape in a mold, and a composite type aspherical surface in which a resin is formed on a glass surface in the aspherical shape. In addition, the lens surface may be formed as the diffraction optical surface, or the lens may be formed as a gradient index lens (GRIN lens) or a plastic lens.

An anti-reflective coating having high transmittance in a wide wavelength region may be applied onto each lens surface in order to reduce flare or ghost to achieve optical performance with high contrast. Accordingly, the flare or the ghost can be reduced, and high optical performance with high contrast can be achieved.

EXPLANATION OF NUMERALS AND CHARACTERS

| | | | |
|---|---|---|---|
| 1 | Head-mounted display | 11 | Image display unit |
| EL | Ocular optical system | | |
| G1 | First lens group | G2 | Second lens group |
| G3 | Third lens group | | |
| L1 | First lens | L2 | Second lens |
| L3 | Third lens | L4 | Fourth lens |
| EP | Eye point | | |
| DOE | Diffraction optical element | DG | Diffraction grating |
| DE1 | First optical element component | DE2 | Second optical element component |
| FSa | First Fresnel surface | FSb | Second Fresnel surface |

The invention claimed is:

1. An ocular optical system, comprising, in order from an eye point, a first lens group having a positive refractive power and a second lens group having a positive refractive power, wherein
one of the first lens group and the second lens group includes a cemented lens having at least two optical members cemented together;
a cemented surface of the cemented lens is a diffraction optical surface configuring a diffraction grating; and at least any one of lens surfaces of lenses constituting the first lens group and the second lens group is a Fresnel surface.

2. The ocular optical system according to claim 1, wherein the Fresnel surface is formed on one side surface of the cemented lens.

3. The ocular optical system according to claim 2, wherein a lens surface different from the Fresnel surface of the cemented lens is an aspherical surface.

4. The ocular optical system according to claim 1, wherein a lens group without including the cemented lens of the first lens group and the second lens group comprises at least one lens, and a lens surface on one side in the one lens is the Fresnel surface.

5. The ocular optical system according to claim 1, wherein
one of the first lens group and the second lens group consists of the cemented lens having the positive refractive power; and
the other of the first lens group and the second lens group consists of one lens having a positive refractive power.

6. The ocular optical system according to claim 1, wherein
the second lens group consists of the cemented lens having the positive refractive power, and
the first lens group consists of one lens having a positive refractive power.

7. The ocular optical system according to claim 1, comprises by including, in order from an eye point, the first lens group, the second lens group, and a third lens group having an aspherical lens.

8. The ocular optical system according to claim 1, wherein
the first lens group and the second lens group each comprise a lens on which the Fresnel surface is formed, thereby satisfying the following conditional expression:

$$1.00 < fR2/fR1$$

where, fR1 denotes a focal length of the lens on which the Fresnel surface is formed in the first lens group; and
fR2 denotes a focal length of the lens on which the Fresnel surface is formed in the second lens group.

9. The ocular optical system according to claim 1, wherein the cemented lens is cemented together through a contact multilayer type diffraction optical element consisting of a first optical element component and a second optical element component, and the diffraction optical surface is formed in an interface between the first optical element component and the second optical element component.

10. The ocular optical system according to claim 9, satisfying the following conditional expression:

$$0 < f/fDOE < 0.15$$

where, f denotes a focal length of the ocular optical system; and
fDOE denotes a focal length of the diffraction optical element.

11. The ocular optical system according to claim 1, wherein the first lens group comprises a lens on which the Fresnel surface is formed, thereby satisfying the following conditional expression:

$$0 < f/fR1 < 0.60$$

where, f denotes a focal length of the ocular optical system; and
fR1 denotes a focal length of the lens on which the Fresnel surface is formed in the first lens group.

12. The ocular optical system according to claim 1, wherein the first lens group comprises a lens on which the Fresnel surface is formed, thereby satisfying the following conditional expression:

$$0 < AS1 < 5.0$$

where, AS1 denotes a maximum value of an aspect ratio of a Fresnel step on the Fresnel surface in the first lens group.

13. The ocular optical system according to claim 1, wherein the first lens group and the second lens group each comprise a lens on which the Fresnel surface is formed, thereby satisfying the following expression:

$$0 < AS2 < 2.5$$

where, AS2 denotes a maximum value of an aspect ratio of a Fresnel step on the Fresnel surface in the second lens group.

14. The ocular optical system according to claim 1, wherein
the first lens group and the second lens group each comprise a lens on which the Fresnel surface is formed; and
a refractive power of the lens on which the Fresnel surface is formed in the first lens group is greater than a refractive power of the lens on which the Fresnel surface is formed in the second lens group.

15. A head-mounted display comprising:
an image display unit capable of displaying an image; and
an ocular optical system for observing the image displayed on the image display unit,
wherein the ocular optical system is the ocular optical system according to claim 1.

* * * * *